US011965956B2

(12) United States Patent
Wang et al.

(10) Patent No.: US 11,965,956 B2
(45) Date of Patent: Apr. 23, 2024

(54) RECOGNIZING RADAR REFLECTIONS USING POSITION INFORMATION

(71) Applicant: Zoox, Inc., Foster City, CA (US)

(72) Inventors: Chuang Wang, Woodside, CA (US); Joshua Kriser Cohen, Sunnyvale, CA (US)

(73) Assignee: ZOOX, INC., Foster City, CA (US)

( * ) Notice: Subject to any disclaimer, the term of this patent is extended or adjusted under 35 U.S.C. 154(b) by 0 days.

(21) Appl. No.: 17/833,528

(22) Filed: Jun. 6, 2022

(65) Prior Publication Data

US 2022/0390597 A1 Dec. 8, 2022

Related U.S. Application Data

(63) Continuation of application No. 16/289,068, filed on Feb. 28, 2019, now Pat. No. 11,353,578.

(51) Int. Cl.
*G01S 13/931* (2020.01)
*G01S 13/08* (2006.01)

(52) U.S. Cl.
CPC ............ *G01S 13/931* (2013.01); *G01S 13/08* (2013.01); *G01S 2013/932* (2020.01)

(58) Field of Classification Search
CPC .... G01S 13/931; G01S 13/865; G01S 13/867; G01S 7/4802; G01S 7/354
USPC ...................................................... 342/70, 54
See application file for complete search history.

(56) References Cited

U.S. PATENT DOCUMENTS 6,323,802 B1 * 11/2001 Tokoro .................. G01S 13/931
                                                  342/70
6,741,204 B2    5/2004 Kumon et al.
9,798,001 B2 * 10/2017 Aizawa .................... G01S 13/42
9,952,312 B2 *  4/2018 Corbett ................... G01S 7/023
10,451,724 B2 * 10/2019 Shimizu ................ G01S 13/584
10,495,732 B2 * 12/2019 Olshansky ............ B60W 30/09
(Continued)

FOREIGN PATENT DOCUMENTS

DE    102012108023 B4 *  3/2021 ........... G01S 13/931
JP       2001116839 A     4/2001
(Continued)

OTHER PUBLICATIONS

Office Action for U.S. Appl. No. 16/288,990, dated Feb. 4, 2021, Wang, "Recognizing Radar Reflections Using Velocity Information", 20 pages.
(Continued)

*Primary Examiner* — Vladimir Magloire
*Assistant Examiner* — Michael W Justice
(74) *Attorney, Agent, or Firm* — Lee & Hayes P.C.; Mike Merkelbach

(57) ABSTRACT

Techniques are discussed for determining reflected returns in radar sensor data. In some instances, pairs of radar returns may be compared to one another. For example, a reflection point may be determined from a first position of a first radar return and a second position of a second radar return. Additional data, e.g., sensor data and/or map data, may be used to determine the presence of objects in the environment. The first return or the second return may be a reflected return if an object is disposed at the reflection point. In some instances, a vehicle, such as an autonomous vehicle, may be controlled at the exclusion of information from reflected returns.

20 Claims, 6 Drawing Sheets

(56) References Cited

U.S. PATENT DOCUMENTS

| | | | |
|---|---|---|---|
| 10,823,846 B2 * | 11/2020 | Takada | G01S 13/931 |
| 10,885,354 B2 * | 1/2021 | Maeda | G01S 15/87 |
| 11,262,442 B2 * | 3/2022 | Takada | G01S 7/415 |
| 2003/0179129 A1 | 9/2003 | Tamatsu et al. | |
| 2006/0114146 A1 * | 6/2006 | Lindenmeier | G01S 13/931 |
| | | | 342/146 |
| 2012/0056773 A1 | 3/2012 | Sato | |
| 2013/0314272 A1 | 11/2013 | Gross et al. | |
| 2015/0130655 A1 * | 5/2015 | Aizawa | G01S 13/42 |
| | | | 342/147 |
| 2016/0274232 A1 | 9/2016 | Schiffmann | |
| 2017/0010344 A1 * | 1/2017 | Corbett | G01S 7/023 |
| 2017/0261602 A1 * | 9/2017 | Olshansky | G01S 13/42 |
| 2017/0307749 A1 * | 10/2017 | Shimizu | G08G 1/166 |
| 2018/0059231 A1 * | 3/2018 | Dewberry | G01S 13/878 |
| 2018/0120842 A1 * | 5/2018 | Smith | G01S 7/412 |
| 2018/0341012 A1 * | 11/2018 | Takada | G01S 7/414 |
| 2019/0018133 A1 * | 1/2019 | Takada | G01S 13/56 |
| 2019/0317204 A1 | 10/2019 | Zhang et al. | |
| 2020/0042001 A1 | 2/2020 | Chu | |
| 2020/0086864 A1 | 3/2020 | Rajendra Zanpure et al. | |
| 2020/0210722 A1 * | 7/2020 | Maeda | G01S 15/87 |
| 2020/0226930 A1 | 7/2020 | Shimbo et al. | |
| 2020/0278435 A1 | 9/2020 | Wang et al. | |
| 2020/0278440 A1 | 9/2020 | Wang et al. | |

FOREIGN PATENT DOCUMENTS

| | | | | |
|---|---|---|---|---|
| JP | 2003270342 A | | 9/2003 | |
| JP | 2009079917 A | | 4/2009 | |
| JP | 2015105836 A | * | 6/2015 | ........... G01S 13/931 |
| WO | WO2007147533 | | 12/2007 | |

OTHER PUBLICATIONS

Office Action for U.S. Appl. No. 16/289,068, dated Mar. 3, 2021, Wang, "Recognizing Radar Reflections Using Position Information", 21 pages.

Office Action for U.S. Appl. No. 16/289,068, dated Aug. 6, 2021, Wang, "Recognizing Radar Reflections Using Position Information", 22 pages.

International Report on Preliminary Patentability dated Sep. 10, 2021, for PCT App. No. PCT/US20/19674, 13 pages.

PCT Search Report and Written Opinion dated Jun. 29, 2020 for PCT Application No. PCT/US2020/019674, 14 pages.

Japanese Office Action mailed Oct. 31, 2023 for Japanese Application No. 2021-550204, a foreign counterpart to U.S. Pat. No. 11,255,958, 11 pages.

* cited by examiner

RECOGNIZING RADAR REFLECTIONS USING POSITION INFORMATION

RELATED APPLICATION

This is a continuation application that claims priority to commonly assigned, co-pending U.S. patent application Ser. No. 16/289,068, filed Feb. 28, 2019, the entire contents of which are fully incorporated herein by reference.

BACKGROUND

Autonomous vehicles utilize various methods, apparatuses, and systems to traverse through environments that include obstacles. For instance, autonomous vehicles may utilize route planning methods, apparatuses, and systems to navigate through areas that may include other vehicles, buildings, pedestrians, or the like. These planning systems may rely on sensor data, including radar data, LiDAR data, image data, and/or the like. However, in some examples, the presence of vehicles, buildings and/or objects in an environment can cause reflections that result in inaccurate or incorrect sensor data, including, for example, false positives. Inaccurate and/or incorrect sensor data can present challenges to safely and comfortably traversing through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
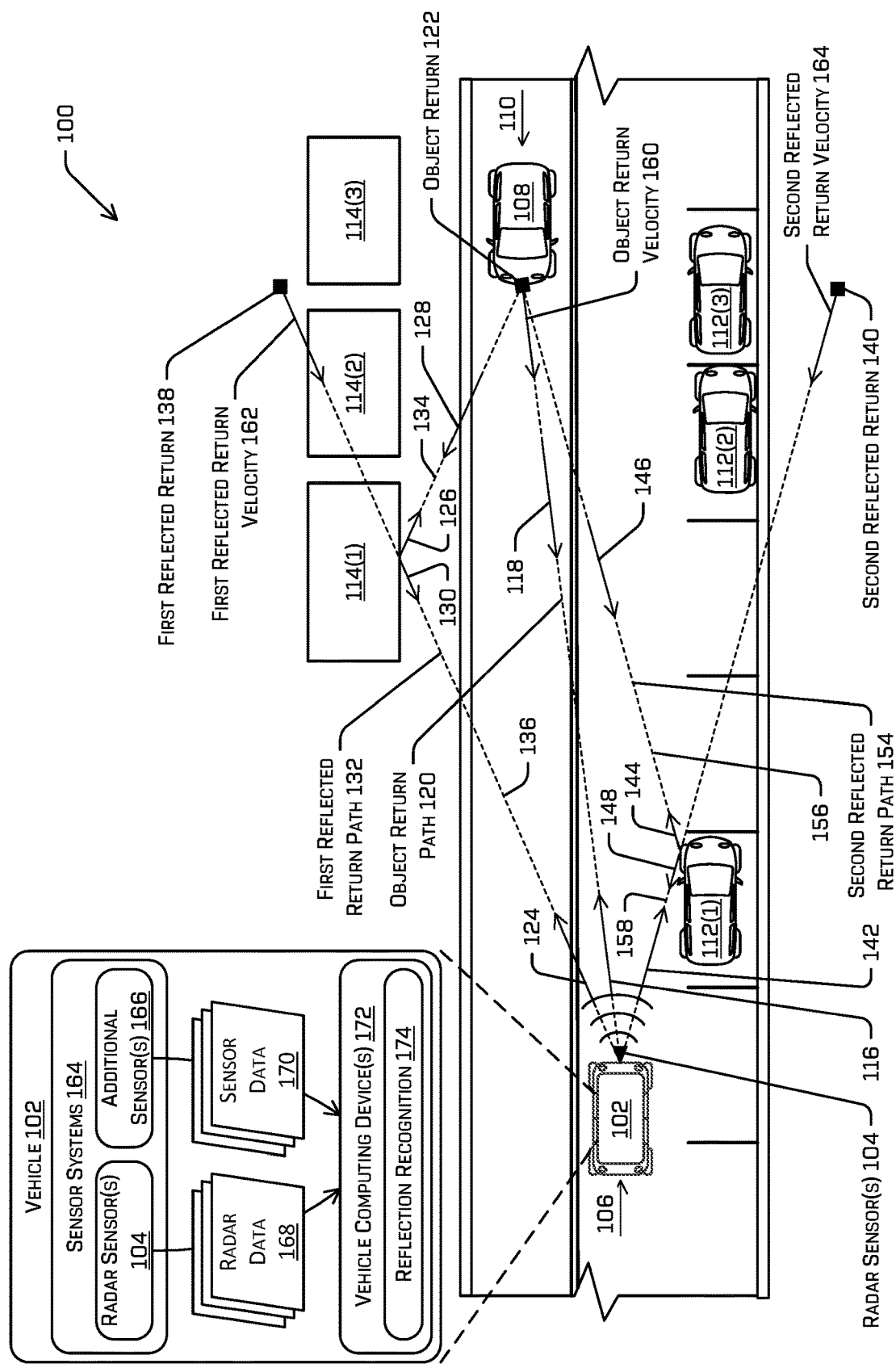
FIG. 1 is a schematic view illustrating an example vehicle and environment in which the vehicle is operating, the vehicle including a radar sensor sensing objects in the environment, in accordance with embodiments of the disclosure.

As discussed above, certain types of sensor data, e.g., radar data, may be susceptible to reflections, e.g., off of vehicles, buildings, and other objects in an environment. Such reflected returns can present challenges to the autonomous vehicle safely and/or comfortably traversing through the environment. For instance, reflected returns can suggest an approaching object that does not actually exist. Planning in response to these non-existent or phantom "objects" may result in the vehicle taking unnecessary actions, e.g., braking, steering, or the like.

This application describes techniques for identifying reflected returns in radar sensor data captured by a radar system. Generally, a radar sensor may emit radio energy that reflects (or bounces) off objects in the environment before returning to the sensor. When the emitted energy returns directly to the radar sensor from an object, the radar sensor may capture an object return, which includes accurate data about the object (e.g., distances, locations, velocities, etc.). However, in some instances, radio energy may reflect off multiple objects in the environment before returning to the radar sensor. In these instances, the radar sensor may capture a reflected return. Reflected returns do not accurately represent objects in the environment. In at least some examples, without knowing whether these returns are from actual objects, or reflections, safety critical path planning for an autonomous vehicle may be impacted.

In some examples, techniques described herein may determine that radar returns are reflected returns using a pair-wise comparison of returns, e.g., returns under consideration, to known object returns. More specifically, radar returns that are not associated with a known object may be compared to an object return (e.g., a return associated with a known object) to determine whether the radar return generally corresponds to a theoretical reflection of the object return off some hypothetical object. In some examples, an object return can be determined from among all radar returns based on information associating the return with a track or other previously-obtained information. By way of non-limiting example, the theoretical reflection can be determined by projecting an object velocity (a magnitude and direction from the object return as may be provided by a radar return) onto a radial direction extending from the vehicle to the return under consideration. A radial component of the projected velocity, e.g., extending along the radial direction, represents an expected velocity of a reflection of the object return along this radial direction. Accordingly, when the magnitude of the radial component of the projected velocity corresponds to the velocity associated with the return in question, the return may be identified as a reflected return.

In some examples, techniques described herein can determine that returns are reflected using a pair-wise comparison of radar returns for which no prior knowledge is available. For instance, any two returns may be compared to determine whether one of the returns, e.g., the farther-away of the returns, could theoretically be a return of the other of the returns. In some examples, such comparison may be based on a projection of a velocity of the closer return onto a position of the farther-away of the returns. In other examples, the positions of the returns can be used to determine a theoretical reflection point on a line between the sensor and the farther-away of the returns.

In some examples, techniques described herein can also function to confirm that the identified reflected return is, in fact, a reflection. For example, techniques described herein can determine a hypothetical reflection point, e.g., a point along the radial direction of the return under consideration, at which radio energy would be reflected if the return under consideration is a reflected return. In aspects of this disclosure, additional sensor information about the environment, e.g., LiDAR data, additional radar data, time-of-flight data, SONAR data, image data, or the like, may be used to confirm the existence of an object proximate the reflection point. Stated differently, the existence of an object at a hypothetical or calculated reflection point may further suggest (and/or confirm) that a return is a reflected return of another return.

Also in some implementations, techniques described herein can determine a subset of all radar returns for investigation as potential reflected returns. For instance, radar returns may be filtered to include only those radar returns that may be reflected returns and/or that may have a non-negligible effect on operation of the vehicle. In some examples, returns associated with a track or other previously-obtained information may be designated as object returns, and thus are not potential reflected returns. Moreover, returns that are relatively closer, e.g., radially closer, to the vehicle than an object return cannot be reflected returns, and thus may be excluded from consideration using the techniques described herein. Moreover, radar returns having a velocity equal to or below a threshold velocity may be disregarded, e.g., because they would not be considered by the planning system of the vehicle. In some examples, the threshold velocity may vary with a distance from the vehicle. In at least some examples, filtering such radar returns may decrease an amount of time, processing required, and/or memory required to determine whether a return is a reflection or an actual object.

In some examples, information about the reflected radar returns may be output for use by a vehicle computing device of an autonomous vehicle to control the autonomous vehicle to safely traverse the environment. For instance, the vehicle computing device can exclude reflected returns from route and/or trajectory planning. In this manner, the autonomous vehicle will not brake, steer, or otherwise take actions responsive to a phantom "object." Moreover, the vehicle computing device may not track or otherwise follow returns that are determined to be reflected returns, which may reduce processing load, for example.

The techniques discussed herein can improve a functioning of a computing device in a number of ways. For example, in the context of determining controls for a vehicle, the amount of data to be considered can be decreased, e.g., by excluding reflected returns, thereby reducing excessive resources devoted to unnecessary determinations about the environment. Improved trajectory generation can improve safety outcomes and can improve a rider experience (e.g., by reducing occurrences of unnecessary braking in response to phantom objects, swerving to avoid phantom objects, and the like). These and other improvements to the functioning of the computer and/or to the user experience are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform), and are not limited to autonomous vehicles. In another example, the techniques can be utilized in an aviation or nautical context, or in any system using machine vision.

FIG. 1 is a schematic view of an environment 100 in which a vehicle 102 is operating. In the illustrated example, the vehicle 102 is driving in the environment, although in other examples the vehicle 102 may be stationary and/or parked in the environment 100. The vehicle 102 includes one or more radar sensor system(s) 104 capturing data representing the environment 100. By way of example and not limitation, the vehicle 102 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

The vehicle 102 may travel through the environment 100, e.g., generally in the direction shown by arrow 106 relative to one or more other objects. For instance, the environment 100 may include dynamic objects, such as an additional vehicle 108 (travelling generally in the direction shown by arrow 110), and static objects, such as a first parked vehicle 112(1), a second parked vehicle 112(2), a third parked vehicle 112(3) (collectively, "the parked vehicles 112"), a first building 114(1), a second vehicle 114(2), and a third vehicle 114(3) (collectively, "the buildings 114"). The additional vehicle 106, the parked vehicles 112, and the buildings 114 are only examples of objects that may be in the environment 100; additional and/or different objects, including but not limited to vehicles, pedestrians, bicyclists, trees, street signs, fixtures, or the like, may also or alternatively be in the environment 100.

In at least one example, and as noted above, the vehicle 102 can be associated with radar sensor(s) 104, and the radar sensor(s) 104 can be disposed on the vehicle 102. The radar sensor(s) 104 may be configured to measure the range to objects and/or the velocity of objects. In some example systems, the radar sensor(s) 104 may include a Doppler sensor, a pulse-type sensor, a continuous wave frequency modulation (CFWM) sensors, or the like. The radar sensor(s) 104 may emit pulses of radio energy at predetermined intervals. In some implementations, the intervals may be configurable, e.g., to promote enhanced detection of objects at relatively far distances or relatively close distances. Generally, the pulses of radio energy emitted by the radar sensor(s) 104 reflect off objects in the environment 100 and can be received by the radar sensor(s) 104, e.g., as radar data or radar returns.

In the example of FIG. 1, radio energy emitted by the radar sensor(s) 104 generally along the direction of arrow 116 may contact the additional vehicle 108 and be reflected back toward the radar sensor(s) 104, e.g., generally along the direction of arrow 118. In this example, the radio energy is emitted and returns generally along the same path, which may be an object return path 120. The object return path 120 is a substantially straight line in the illustrated example. The radio energy reflected along the object return path 120 is captured by the radar sensor(s) 104, e.g., as an object return 122. The object return 122 is illustrated as a block at a position determined based on the captured data. For example, information associated with the object return 122 may include information indicative of a location in the environment, e.g., a location of the additional vehicle 108. The location information may include a range and azimuth relative to the vehicle 102 or a position in a local or global coordinate system. Also in implementations, the object return 122 may include signal strength information. For example, the signal strength information can indicate a type of the object. More specifically, radio waves may be reflected more strongly by objects having certain shapes and/or compositions. For example, broad, flat surfaces and/or sharp edges are more highly reflective than rounded surfaces, and metal is more highly reflective than a person. In some instances, the signal strength may include a radar cross-section (RCS) measurement. The object return 122 may also include velocity information. For instance, a velocity of the additional vehicle 108 may be based on a frequency of radio energy reflected by the additional vehicle 108 and/or a time at which the reflected radio energy is detected.

The object return 122 may be an example of accurate data captured by the radar sensor(s) 104, e.g., corresponding to the additional vehicle 108. However, the radar sensor(s) 104 can also capture returns that may be less reliable. For example, FIG. 1 also illustrates that radio energy emitted by the radar sensor(s) 104 generally along the direction of arrow 124 may reflect off the first building 114(1), to proceed generally along the direction of arrow 126. In the illustrated example, the radio energy reflected off the first building 114(1) may then be reflected by the additional vehicle 108 back toward the first building 114(1), generally along the direction of arrow 128, i.e., opposite the direction of the arrow 126. Finally, the radio energy may then reflect again off the first building 114(1), and return to the radar sensor(s) 104, generally along the direction of arrow 130. Accordingly, radio energy reflected off the additional vehicle 108 may return to the radar sensor(s) 104 along a first reflection return path 132 that includes a first leg 134 between the additional vehicle 108 and the first building 114(1) and a second leg 136 between the first building 114(1) and the vehicle 102 (e.g., the radar sensor(s) 104). Such reflected energy may be captured by the radar sensor(s) 104 as a first reflected return 138. As illustrated in FIG. 1, the first reflected return 138 is received along the direction of the second leg 136, e.g., along the arrows 124, 130, but has a range equal to the distance of the first reflected return path 132, e.g., the distance that is the sum of the distance of the first leg 134 and the distance of the second leg 136. As will be appreciated from FIG. 1 and the foregoing description, the first reflected return 138 suggests the presence of an object at the location corresponding to the first reflected return 138, i.e., along the direction of the second leg 136. However, and as described herein, such "object" is a non-existent, phantom "object."

FIG. 1 illustrates that the radar sensor(s) 104 can also capture a second reflected return 140 corresponding to radio energy reflected off the first parked vehicle 112(1) and the additional vehicle 108. More specifically, radio energy emitted by the radar sensor(s) 104 generally along the direction of arrow 142 may reflect off the first parked car 112(1) to proceed generally along the direction of arrow 144. The radio energy may then contact and reflect off the additional vehicle 108 back toward the first parked car 112(1) generally along the direction of arrow 146, i.e., opposite the direction of the arrow 144. Finally, the radio energy may then reflect again off the first parked vehicle 116(1), generally along the direction of arrow 148. Accordingly, the radio energy corresponding to the second reflected return 140 may travel along a second reflected return path 154 that includes a first leg 156 between the additional vehicle 108 and the first parked vehicle 112(1) and a second leg 158 between the first parked vehicle 112(1) and the vehicle 102 (e.g., the radar sensor(s) 104). As illustrated in FIG. 1, the second reflected return includes information about radio energy received along the second leg 158, e.g., along the direction of the arrows 142, 148, but has a range equal to the distance of the second reflected return path 154, e.g., the distance that is the sum of the distance of the first leg 156 and the second distance of the second leg 158. As will be appreciated from FIG. 1 and the foregoing description, the second reflected return 140 suggests the presence of an object at the location corresponding to the second reflected return 140, i.e., along the direction of the second leg 158. However, and as described herein, such "object" is a non-existent, phantom "object."

In addition to including position information (e.g., from the range and azimuth) illustrated by FIG. 1, the object return 122, the first reflected return 138, and the second reflected return 140 (herein, the first reflected return 138 and the second reflected return 140 may be referred to as "the reflected returns 138, 140") may also include velocity information. More specifically, the object return 122 may include information about an object velocity 160, e.g., corresponding to a speed (of the additional vehicle 108) along the direction of the arrow 118. Similarly, the first reflected return 138 may include information about a first reflected return velocity 162, e.g., a speed along the direction of the second leg 136 of the first reflected return path 132, and the second reflected return 140 may include information about a second reflected return velocity 164, e.g., a speed along the direction of the second leg 158 of the second reflected return path 154. Accordingly, the object return 122 provides information about the additional vehicle 108 (e.g., position, velocity), whereas the first reflected return 138 suggests that an object (a phantom object) is approaching from the position associated with that return at the first reflected return velocity 162 and the second reflected return 140 suggests that an object (a phantom object) is approaching from the position associated with that return at the second reflected return velocity 164. As described herein, the vehicle 102 may include a planning system that, among other functions, determines routes, trajectories, and/or controls relative to objects in the environment 100 based on received sensor data. However, a planning system using the reflected returns 138, 140 may plan to react to objects that do not actually exist.

Techniques described herein may improve planning system accuracy and performance by recognizing returns, such as the returns 138, 140 as reflected returns. For instance, as further illustrated in FIG. 1, the radar sensor(s) 104 may be one of a plurality of sensor systems 164 associated with the vehicle 102. In some examples, the sensor systems 164 may further include one or more additional sensor(s) 166, which may include additional radar sensors, light detection and ranging (LiDAR) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc.

As also illustrated in FIG. 1, the radar sensor(s) 104 can generate radar data 168 and the additional sensor(s) 166 can generate sensor data 170. The radar data 168 may include information about the object return 122, the first reflected return 138, and the second reflected return 140, including, but not limited to, position, velocity, and/or other information associated therewith. For In some examples, the radar data 168 may also include signal strength information, which may include an RCS measurement. The radar data can also include specific information about the sensor, including but not limited to an orientation of the sensor, e.g., a pose of the sensor relative to the vehicle, a pulse repetition frequency (PRF) or a pulse repetition interval (PRI) for the sensor, a field of view or detecting arc, or the like. In some implementations, certain aspects of the radar data 168 may be pre-configured, e.g., the field of view, the orientation, the PRF or PRI, or the like, in which case that data may be available, e.g., in storage, and may not be transferred with radar returns, for example. The sensor data 170 can include any information about the environment 100 and/or the additional sensor(s) 166. By way of non-limiting example, when the additional sensor(s) 166 include a LiDAR sensor, the sensor data 170 may include point cloud data and when the additional sensor(s) 166 include a camera, the sensor data 170 may include image data. The radar sensor(s) 104 and the additional sensor(s) 166 may generate the radar data 168 and the sensor data 170, respectively, at predetermined intervals, which may the same or different for different of the sensor systems 164. For example, the radar sensor(s) 104 may have a scanning frequency at which returns are captured and the radar data 168 is generated.

The radar data 168 and the sensor data 170 can be received at one or more vehicle computing devices 172 and utilized by the vehicle computing device(s) 172, e.g., to perform planning using a planning system (not shown). In the illustrated example, the sensor systems 164 and the vehicle computing device(s) 172 are part of, e.g., disposed on, the vehicle 102. However, in other examples, some or all of the sensor systems 164 and/or vehicle computing device(s) 172 may be separate from and/or disposed remotely from the vehicle 102. In such arrangements, data capture, processing, commands, and/or controls may be communicated to/from the vehicle 102 by one or more remote computing devices via wired and/or wireless networks.

In at least one example, the vehicle computing device(s) 172 can utilize the radar data 168 and the sensor data 170 captured by the sensor system(s) 164 in a reflection recognition component 174. For example, the reflection recognition component 174 can receive the radar data 168, including the object return 122, the first reflected return 138, and the second reflected return 140, and determine that the reflected returns 138, 140 are reflected returns, not returns associated with actual objects in the environment. By making this distinction, the reflection recognition component 174 can send only the object return 122 (and not the reflected returns 138, 140) to a planning system and/or use the additional returns to further refine an estimated position and/or velocity of an object. Accordingly, control planning can be implemented at the exclusion of the reflected returns 138, 140. As described in more detail below with reference to FIG. 2, the reflection recognition component 174 can determine whether a return (e.g., a candidate or an unconfirmed return) is a reflected return by comparing two returns, such as the object return 122 and an additional return, such as the return 138 and/or the return 140. For instance, the reflection recognition component 174 can "project" a known object return, such as the object return 122, onto a line that extends along a direction associated with the unconfirmed return, e.g., a direction extending radially from the radar sensor(s) 104 and passing through the unconfirmed return. Techniques for projecting the object return 122 are described in more detail below with reference to FIG. 2, but the projection of the return will have a velocity component having a direction the same as the direction of velocity associated with the unconfirmed return (e.g., a radial direction relative to the radar sensor(s) 104). The reflection recognition component 174 can also determine a magnitude of the velocity associated with the projection of the object return 122. In some implementations, when this magnitude corresponds to the magnitude of the velocity of the unconfirmed return, the reflection recognition component 174 can determine that the unconfirmed return is (or is likely) a reflected return. As used herein, the magnitudes may correspond when they are substantially equal, e.g., within some threshold range or margin of error.

The reflection recognition component 174 may utilize some a priori knowledge of the objects in the environment and/or the environment itself. For example, the reflection recognition component 174 may only project returns that are known object returns. In some examples, this knowledge may be from tracking and/or previously identifying an object, such as the additional vehicle 108. For example, such tracking and/or identification may be based on previously captured radar data 168 and/or previously-captured sensor data 170 sensing the object. For instance, objects such as the additional vehicle 108 may be tracked for several seconds and/or at extended distances. On the other hand, reflected returns may be more ephemeral, as they require an alignment of the vehicle 102, the additional vehicle 108, and the intermediate, reflecting objects/surfaces (e.g., the first parked vehicle 112(1) and the first building 114(1)). As one or more of those objects moves, the conditions (e.g., the relative alignment and/or orientation) that allowed for the reflected return may disappear, causing the reflected return to vanish from subsequent scans of the radar sensor(s) 104. Additionally, or alternatively, map data available to the vehicle 102 (such as may be downloaded from time to time based on a location of the vehicle 102, or otherwise accessible to the vehicle) may comprise three-dimensional representations of an environment, such as, for example, a mesh of the local three-dimensional environment. In such an example, the reflection recognition component 174 may determine that first reflected return 138 is a non-physical return based on the knowledge of corresponding building 114(1).

The reflection recognition component 174 can also include functionality to confirm its determination that a candidate return is a reflected return. In some instances, the reflection recognition component 174 can attempt to track the return, e.g., over subsequent scans received as the radar data 168. As noted above, relative movement of the vehicle 102 to the additional vehicle 108 may cause the reflective conditions to abate, thus resulting in a failure to receive subsequent returns that correspond to the "object" associated with the reflected return. However, disregarding a potential (on-coming) object until its track can be verified over serially-collected radar scans may slow reaction time, which can be unsafe. Accordingly, in other implementations, the reflection recognition component 174 can determine, e.g., using the sensor data 170 and/or the radar data 168 whether a reflective object is disposed along the direction to the reflected return. With reference to FIG. 1, in some examples LiDAR data, image data, or the like may confirm the presence of the first parked vehicle 112(1) and/or the first building 114(1). Accordingly, the reflection recognition component 174 can identify the first parked vehicle 112(1) and/or the first building 114(1), and based on the location of those objects, e.g., at a junction between the legs of the respective reflected return paths 132, 154, confirm the previous determination that the returns are reflected returns 138. The map data may be helpful to identify static, fixed objects, e.g., the buildings 114, ground topologies, street signs, utility fixtures, or the like. However, real-time or near-real-time sensor data may be required to identify movable objects, whether static or dynamic. For instance, the parked vehicles 112, pedestrians, bicyclists, other moving vehicles, or the like, may not be available via map data.

In some implementations, the reflection recognition component 174 can process radar returns to determine whether they are reflected returns in real-time or near real-time. For example, the reflection recognition component 174 can compare a plurality of returns, e.g., in parallel, to known object returns, such as the object return 122. In one example, all returns in a radar scan that are not known object returns may be compared to known object returns to determine whether such returns are reflections. In some other implementations, the reflection recognition component 174 can filter returns, e.g., to exclude points that are unlikely to be, or physically cannot be, reflections. By way of nonlimiting example, returns that are relatively closer than a known object return cannot be a reflection of an object return. In other examples, the reflection recognition component 174 may exclude returns that indicate a velocity below a certain threshold, or a zero velocity. Other filtering techniques also may be used.

Although examples described herein may compare points or returns to a known object return 122, in other examples, the reflection recognition component 174 can, additionally or alternatively, compare pairs of returns, e.g., without knowledge that one of the returns is a known object return. More specifically, techniques described herein can determine that two returns may be reflections of each other, regardless of whether one of the returns is an object return. For example, when a pair of returns is considered, the farther-away return can be tagged or otherwise designated as a potential reflection. Further processing can be used as a basis for determining whether the closer return is associated with an object in the environment (or otherwise that the further return is associated with a reflection). The reflection recognition component 174 can perform high-level filtering as described herein to identify a subset of points for pairwise comparison. By way of non-limiting example, returns below a threshold velocity may be omitted, pairs that have too disparate (e.g., equal to or above a threshold difference) in position and/or velocity may not be compared, or the like. In at least some examples, various techniques may be combined to improve a level of certainty as to whether a return is a reflection.

Figure 2:
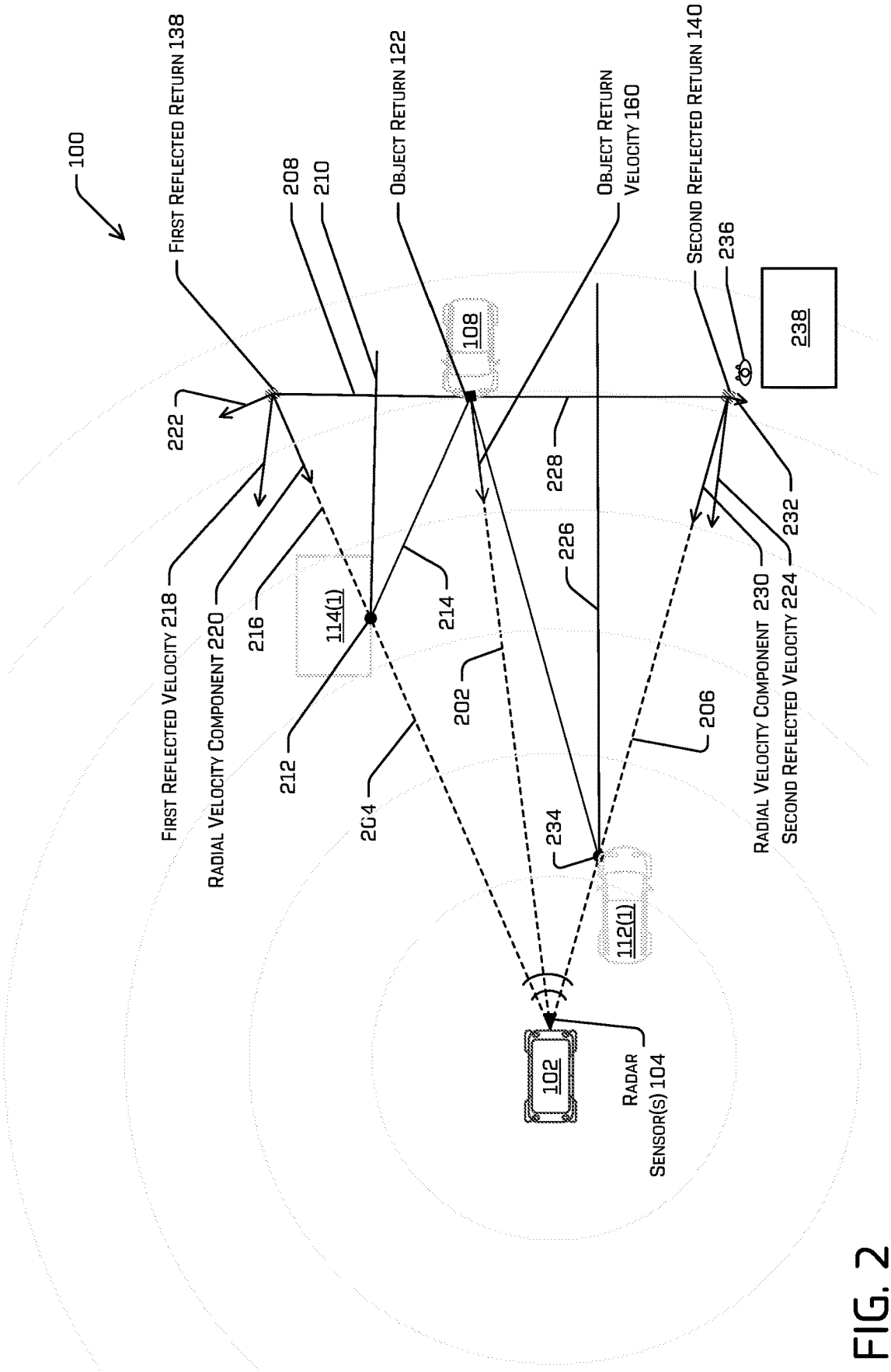
FIG. 2 is a schematic view of the environment of FIG. 1, illustrating example techniques for using velocity information to differentiate radar returns associated with objects in the environment from reflected returns reflected off an intermediate object, in accordance with embodiments of the disclosure.

FIG. 2 is another schematic view of the environment 100 that shows additional aspects of this disclosure. To avoid confusion, elements from FIG. 1 that are specifically discussed with reference to FIG. 2, like the environment 100, include the same reference numerals in FIGS. 1 and 2. Moreover, for clarity, some elements of the environment 100 are grayed out in FIG. 2.

More specifically, FIG. 2 illustrates the vehicle 102, the additional vehicle 108, the first parked vehicle 112(1), and the first building 114(1). FIG. 2 also illustrates the object return 122, the first reflected return 138, and the second reflected return 140. As discussed above in connection with FIG. 1, the object return 122 and reflected returns 138, 140 may include position and velocity information based on the attributes of radio energy received at the radar sensor(s) 104. For example, the object return 122, which is spaced a distance from the vehicle 102 along a line 202 passing through both the vehicle 102 and the additional vehicle 108, may indicate both the position of the object return (and thus the position of the additional vehicle 108) and the object return velocity 160. As noted, because the object return 122 is a known (e.g., from previously-obtained data about the environment 100 and/or the additional vehicle 108, such as a track) direct reflection from the additional vehicle 108, e.g., along the line 202, the object return may be considered an accurate representation of a portion of the additional vehicle 108. As noted above, the existence of the object, e.g., the additional vehicle 108, or the knowledge that a return is an object return, e.g., the object return 122, may not be required in all instances. Techniques described here may apply to pairwise comparison of returns to determine a likelihood that returns are reflections of each other.

The reflected returns 138, 140 also include at least position and velocity information associated with radio energy received at the radar sensor(s) 104. As discussed above, the first reflected return 138 includes information about a first reflected return velocity at the illustrated position along the line 204. The distance of the first reflected return 138 along the line 204 is the distance or range determined by the radar sensor(s) 104 and corresponds to a distance traveled by received radio energy, e.g., the distance corresponding to the first reflected return path 132 shown in FIG. 1. Similarly, the second reflected return 140 includes information about a second reflected return velocity at the illustrated position along the line 206. The distance of the second reflected return 140 along the line 206 is the distance or range determined by the radar sensor(s) 104 and corresponds to a distance traveled by received radio energy, e.g., the distance corresponding to the second reflected return path 154, shown in FIG. 1.

Techniques described herein may utilize geometry in the environment 100 to determine whether a radar return is a reflected return. For example, at capture at the radar sensor(s) 104, the object return 122 and the reflected returns 138, 140 are mere returns. Only through some previously-obtained knowledge about the environment 100 and/or objects in the environment 100 can the object return 122 be attributed with certainty to the additional vehicle 108. In some instances, a tracker or other component associated with the vehicle 102 may have tracked the additional vehicle 108 and a return is identified as the object return 122 when it matches an expectation associated with the track. In other examples, as described herein, the object return 122 can be considered, e.g., as one return in a return-pair, regardless of whether the object return 122 is attributed with the additional vehicle 108. While the object return 122 is illustrated as a single point, at a centrally-located position at the front of the additional vehicle 108, the object return 122 may correspond to one or more other returns and/or one or more other locations on the additional vehicle 108. By way of non-limiting examples, attributes of the object return, e.g., the object return velocity 160, may be determined based on a plurality of returns associated with the additional vehicle 108. For instance, the object return 122 may be an average of a plurality of returns from the additional vehicle 108.

As noted above, unlike the object return 122, reflected returns may be ephemeral, occurring only when certain conditions, e.g., geometrical conditions (which may cause reflected returns to move irregularly or come in and out of existence), are present. Thus, no track or other a priori knowledge exists about reflected returns. However, techniques described herein determine whether a return is a reflection or may directly correspond to an actual object in the environment 100.

As noted above, the first reflected return 138 corresponds to a return positioned along the line 204. To characterize the first reflected return 138 as a reflected return, techniques herein may consider the return as a pair, along with the object return 122. For instance, because the direction of the line 204 is known and the position of the first reflected return 138 on the line 204 is known relative to the radar sensor, the object return 122 can be projected onto the position of the first reflected return. Conceptually, projecting the object return 122 can include determining a line 208 that connects the location associated with the object return 122 (e.g., along the radial line 202) with the location associated with the first reflected return 138 (e.g., along the radial line 204). As also illustrated, a line 210 perpendicular to and bisecting the line 208 intersects the line 204 at a reflection point 212, and, as a result, a distance of a line segment 214 between the reflection point 212 and the object return 122 is equal to a distance of a line segment 216 between the reflection point 212 and the first reflected return 138. Moreover, the object return velocity 160 can be reflected about the line 210, as a first reflected velocity 218. Once determined, the first reflected velocity 218 can be parsed into two velocity components—a radial velocity component 220, generally along the line 204, and a tangential velocity component 222, normal to the radial velocity component 220. The radial velocity component 220 is the projected velocity of the object return 122 along the first direction 204. Stated differently, the first projected velocity is the radial velocity component 220 of the first reflected velocity 218, and the first reflected velocity 218 is a mirror-image about the line 210 of a vector representing the object return velocity 160.

In the example of FIG. 2, the radial velocity component 220 (the projected velocity) is the velocity (i.e., magnitude and direction) that would be sensed by the radar sensor(s) 104 if radio energy bouncing off the additional vehicle 108 was also reflected at the reflection point 212. As will be appreciated, the radial velocity component 220 of the first reflected velocity 218 is along the same direction (i.e., along the line 204) as the first reflected return velocity 162 (shown in FIG. 1, not in FIG. 2). Thus, if the magnitudes of the radial velocity component 220 (the first projected velocity) and of the first reflected return velocity 162 are substantially similar, e.g., within a predetermined threshold or range of each other, the first reflected return 138 can be flagged, tagged, or otherwise identified as a likely reflection.

FIG. 2 illustrates a similar conceptualization of determining whether the second reflected return 140 is a reflected return. For example, a second reflected velocity 224 at the position of the second reflected return 140 may be a mirror image of the object return velocity 160, about a line 226. The line 226 is perpendicular to and bisects a line 228 extending between the position of the object return 122 and the position of the second reflected return 140. The second reflected velocity 224 includes a radial velocity component 230, i.e., along the radial line 206, and a tangential velocity component 232, i.e., perpendicular to the radial line 206.

As also illustrated in FIG. 2, the line 226 contacts the radial line 206 at a reflection point 234. As discussed above, the radial velocity component 230 of the second projected velocity 224 is the projected, e.g., expected, velocity (i.e., direction and magnitude) of a return associated with radio energy that bounces off the additional vehicle 108 and reflects back to the radar sensor(s) 104 at the reflection point 234. Stated differently, the radial velocity component 230 is the projected velocity and corresponds to the expected return associated with a reflection at the reflection point 234. As with the first projected return, the direction of the radial velocity component 230 is substantially the same as the direction of the second reflected return velocity 164. That is, both are along the line 206. Accordingly, if the magnitude of the radial velocity component 230 (the second projected return) and the magnitude of the second reflected return velocity 164 are substantially the same, the second reflected return 140 can be tagged, flagged, or otherwise identified as a likely reflection.

In implementations of this disclosure, and as described further herein, upon determining that the reflected returns 138, 140 are reflected returns, e.g., because the respective radial velocity components 220, 230 are substantially the same as the first and second reflected return velocities 162, 164, the vehicle 102 can disregard, e.g., exclude from planning, the reflected returns 138, 140. The vehicle 102 may also confirm the reflections, e.g., by determining that an object is present at each of the reflection points 212, 234. For example, the vehicle 102 can confirm the presence of an object using sensor data, map data, or the like, as described herein. In at least some examples, the returns may be flagged such that other components may be aware that there may be no corresponding object associated therewith.

FIG. 2 also shows another example implementation, in which a pedestrian 236 exits a building 238 and enters the environment 100. As illustrated, the pedestrian 236 may enter the environment at a location close to the position associated with the second reflected return 140. The radar sensor(s) 104 may generate radar data that includes information about the newly-present pedestrian. Because the pedestrian 236 has not been tracked previously, i.e., because the pedestrian 236 just appeared, implementations described herein may compare the return associated with the pedestrian 236 to a known object return, e.g., the object return 122, using techniques described herein. For example, the object return velocity 160 may be projected onto a location associated with pedestrian 236. Because the pedestrian 236 is farther from the radar sensor(s) 104 than the additional vehicle 108, a reflection point can also be identified. In the illustrated example, the reflection point will be close to the reflection point 234. A radial component of the projected object return velocity at the location of the pedestrian return can also be determined, as in other examples. However, because the pedestrian return is not a reflected return, the magnitude of the velocity of the radial velocity component of the projected object return velocity are likely to be dissimilar. For instance, unless the pedestrian is walking in such a way that a component of the pedestrian's velocity toward the radar sensor(s) 104 matches that of the reflected return, the pedestrian return will (correctly) not be identified as a reflection. Upon determining that the pedestrian return is not a reflection, the pedestrian's movement may be tracked and/or information about the pedestrian 236 may be used to generate controls for the vehicle.

Aspects of the disclosure are not limited to the example implementations illustrated in FIG. 2. For example, techniques described herein can be used to identify reflections of other objects in the environment, including reflections off the vehicle 102. In some examples, radio energy reflected by the additional vehicle 108 can reflect (or bounce) off of the vehicle 102, travel back to the additional vehicle 108 (or other object), and reflect again off the additional vehicle before being captured by the radar sensor(s) 104. Stated differently, detected radio energy can traverse the path along the line 202 four times (twice in each direction) before being captured at the radar sensor(s). This "double-bounce" may result in a return along the direction 202, but at twice the distance from the vehicle 102. In some examples, the magnitude of the velocity will be different from the magnitude of the object return velocity (e.g., half the velocity), which can result in an identification of the reflected return.

Moreover while FIG. 2 illustrates the intermediate, reflecting objects as stationary objects, in other implementations techniques described herein can also determine whether returns are reflected off moving objects. For example, the velocity of an intermediate object will be known (e.g., from other radar returns) and that velocity can be used to alter the radial component of the projected velocity. Other modifications also are contemplated.

Figure 3:
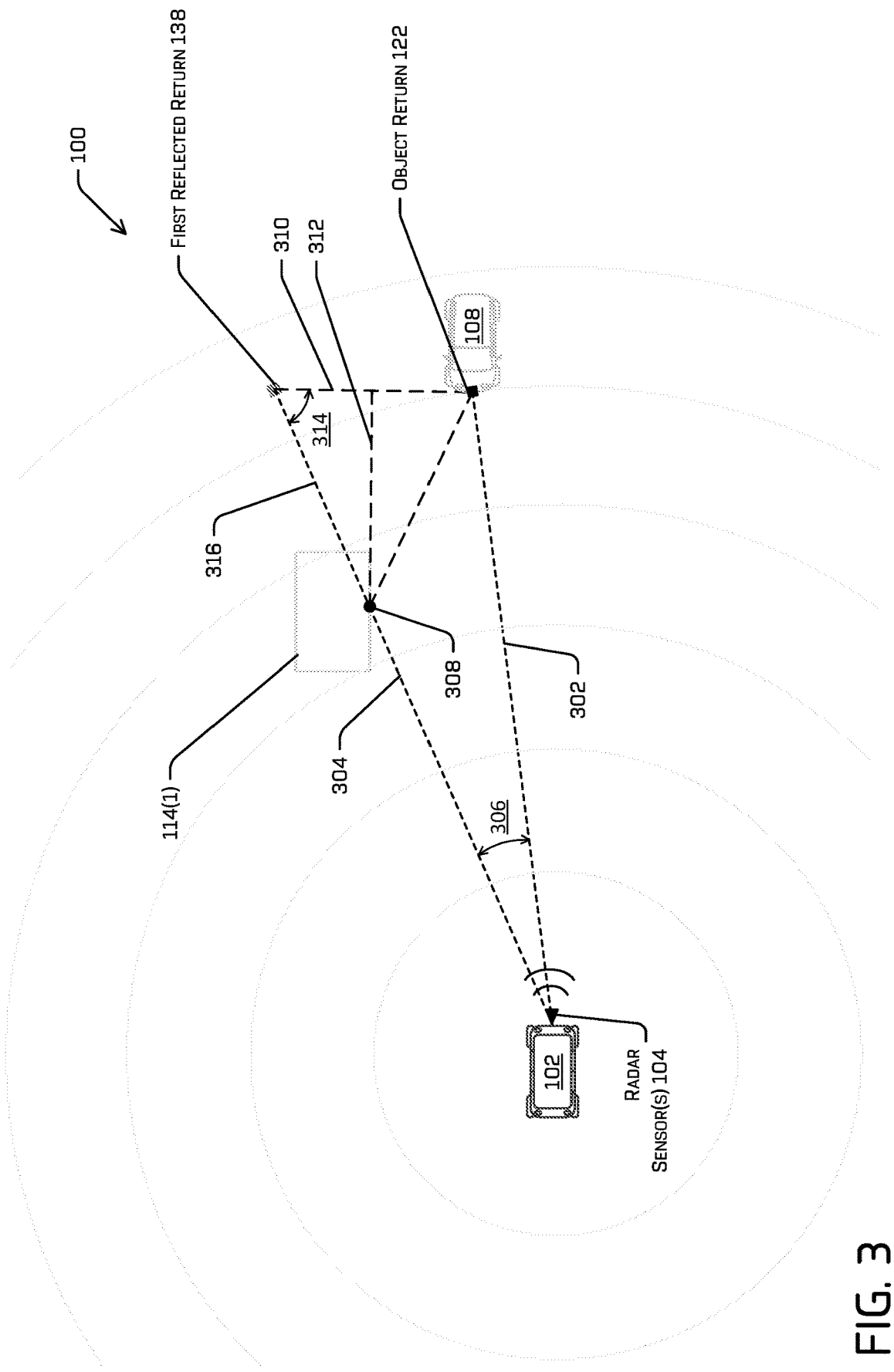
FIG. 3 is another schematic view of the environment of FIG. 1, illustrating example techniques for using position information to differentiate radar returns associated with objects in the environment from reflected returns reflected off an intermediate object, in accordance with embodiments of the disclosure.

FIG. 3 illustrates another schematic view of the environment 100 and is used to illustrate an alternative methodology for determining whether returns are (or are likely to be) reflections of other returns. More specifically, FIG. 3 may illustrate techniques that use geometry to determine a reflection point, which reflection point may then be compared to environmental information, e.g., to determine whether the reflection point corresponds to an object in the environment.

More specifically, FIG. 3 illustrates the object return 122 (off the additional vehicle 108) and the first reflected return 138. For clarity, the second reflected return 140 is not illustrated, although the techniques described with reference to the pair of returns including the first reflected return 138 and the object return 122 can be applied to any pair of radar returns, including, for example, the object return 122 and the second reflected return 138, the first reflected return 138 and the second reflected return 140, and/or any other pair of returns. As described herein, although a priori knowledge of the environment 100 may allow for association of the object return 122 with the additional vehicle 108, implementations of this disclosure may also apply equally to any pair of radar returns, regardless of association with a known object and/or regardless of the availability of a priori knowledge of the environment 100. Thus, while the returns are labelled as an "object" return and a "reflected" return one or both of those labels may not be known until after additional processing. In at least some examples, such labels may be used to aid in guiding an autonomous vehicle. For example, a "reflected" return may still be considered for navigation, though its importance down weighted, or otherwise accounted for when planning.

As described herein, the radar sensor(s) 104 may receive only range, position, and/or velocity (speed) information about returns. Thus, for example, the radar sensor(s) 104 may generate sensor data indicative of a position of the object return 122 and a position of the first reflected return 138. For example, in FIG. 3, a line 302 in FIG. 3 is a line between the position of the object return 122 and a position of the radar sensor(s) 104 and a line 304 is a line between the position of the first reflected return 138 and the position of the radar sensor(s) 104. Based on the returns 122, 138, i.e., the positions of the returns 122, 138, lengths of the lines 302, 304 and an angle 314 between the lines 302, 304 are known (or can be readily determined). Techniques described herein can determine, using the lines 302, 304 and the angle 314, a potential or theoretical reflection point 308 along the line 304, at which radio energy reflected first off an object associated with the object return 122 (e.g., the additional vehicle 108) would reflect prior to being received at the radar sensor(s) 104. Once the location of the theoretical reflection point 308 is determined, techniques described herein can determine whether an object is present at the theoretical reflection point 308, thereby confirming (or at least suggesting) that the first reflected return 138 is a reflection of the object return.

More specifically, a distance between the first reflected return 138 and the object return 122, e.g., a distance of a line 310 shown in FIG. 3, can be determined using the distances of the lines 302, 304 and the angle 306. For example, the law of cosines can be used to determine the length of the line 310, though not required. The theoretical reflection point 308 may then be determined as the intersection of the line 304 and a line 312 that bisects and is perpendicular to the line 310 extending between the returns 122, 138. For example, simple geometry can be used to determine an angle 314 between the line 304 extending between sensor 304 and the first reflected return 138 and the line 310 extending between the first reflected return 138 and the object return 122. The length of the line segment 316 between the first reflected return 138 and a reflection angle 316 bisected by the line 312 can also then be readily determined, to provide a position of the reflected return 308 along the line 304. Further, if the first reflected return 138 is a true reflection, the distance of line segment 316 would be equal to the distance from the object return 122 to the reflection point 308. This additional piece of information can be used (either in addition or alternatively) to calculate the position of the reflection point 308.

In the implementation just described, the potential reflection point 308 can be determined using only geometry. For instance, no velocity information about the returns is necessary. However, a potential reflection point can be determined for any pair of returns at different distances. Accordingly, techniques described herein can also determine whether an object is present at the potential reflection point to determine whether one of the returns, e.g., the farther-away return, is a reflection. For example, sensor data, including but not limited to LiDAR data, image data, additional radar data, or the like, can be used to determine whether an object is present proximate the location of the theoretical reflection point 308. In the illustrated example, the building 114(1) may be identified using image data, LiDAR data, and/or other sensor data captured by the vehicle 102. In other embodiments, map data may confirm the presence of an object at the reflection point 308. In some examples, velocity information can be used to determine a potential reflection based at least in part on projecting a velocity from a return onto a unit vector associated with the other return. Such projected velocity may then be compared directly to the velocity of the other return.

Aspects of FIGS. 2 and 3 (and of FIGS. 5 and 6, below) are described with reference to components illustrated in FIG. 1, in the environment 100 of FIG. 1 by way of example. However, the examples illustrated and described with reference to FIGS. 2, 3, 5, and 6 are not limited to being performed in the environment 100 or using the components of FIG. 1. For example, some or all of the examples described with reference to FIGS. 2, 3, 5, and 6 can be performed by one or more components of FIG. 4, as described herein, or by one or more other systems or components.

Figure 4:
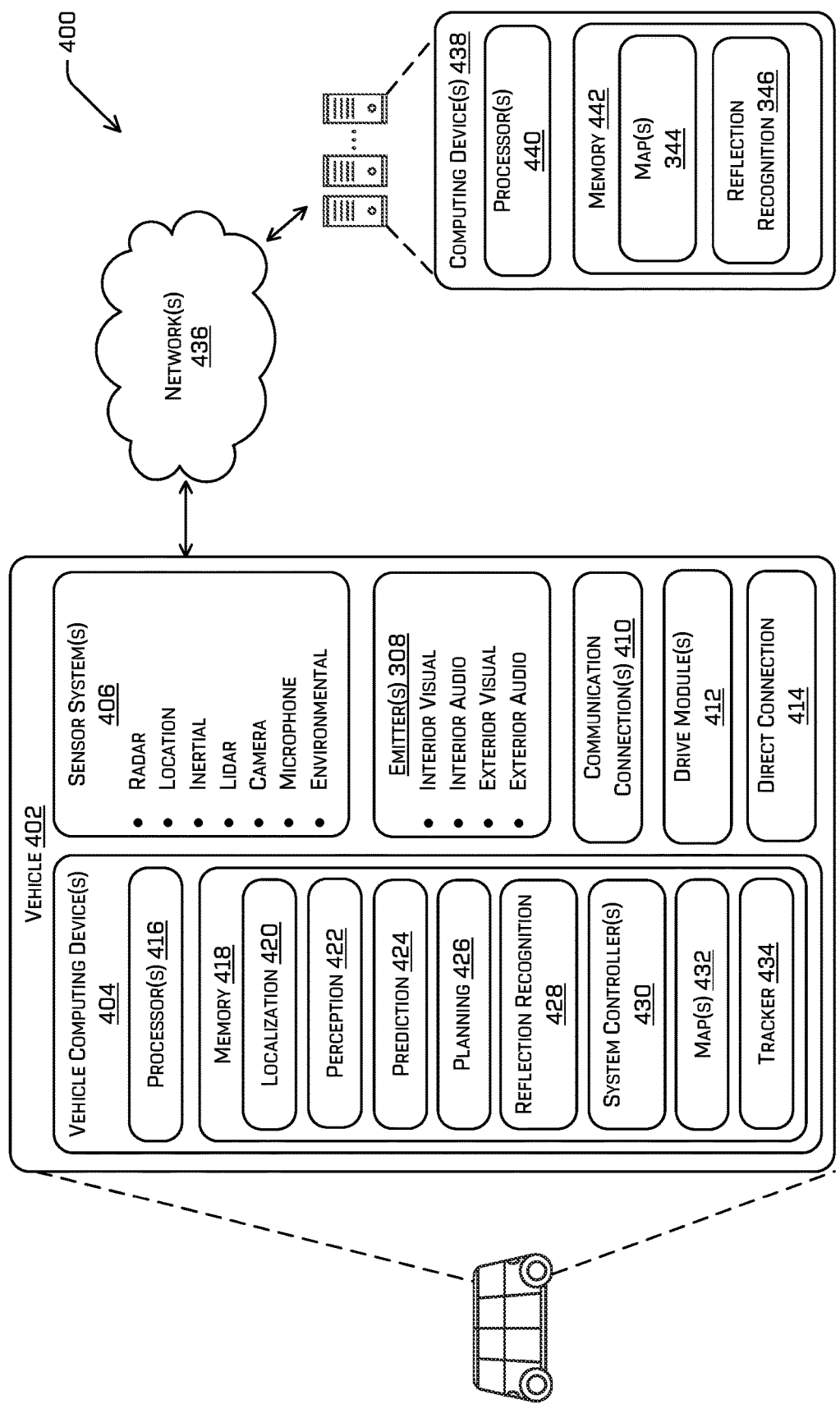
FIG. 4 is a schematic block diagram of an example system including a vehicle and a computing device usable to implement radar reflection recognition techniques described herein, in accordance with embodiments of the disclosure.

FIG. 4 depicts a block diagram of an example system 400 for implementing the techniques described herein. In at least one example, the system 400 can include a vehicle 402, which may be the same as or different from the vehicle 102 shown in FIG. 1.

The vehicle 402 can include a vehicle computing device(s) 404, one or more sensor systems 406, one or more emitters 408, one or more communication connections 410, one or more drive modules 412, and at least one direct connection 414.

The vehicle computing device(s) 404 can include one or more processors 416 and memory 418 communicatively coupled to the one or more processors 416. In the illustrated example, the vehicle 402 is an autonomous vehicle. However, the vehicle 402 could be any other type of vehicle, or any other system having at least one sensor (e.g., a camera enabled smartphone). In the illustrated example, the memory 418 of the vehicle computing device 404 stores a localization component 420, a perception component 422, a prediction component 424, a planning component 426, a reflection recognition component 428, one or more system controller(s) 430, one or more maps 432, and a tracker component 434. Though depicted in FIG. 4 as residing in the memory 418 for illustrative purposes, it is contemplated that the localization component 420, the perception component 422, the prediction component 424, the planning component 426, the reflection recognition component 428, the system controller(s) 430, the map(s)s 432, and/or the tracker component 434 can additionally, or alternatively, be accessible to the vehicle 402 (e.g., stored on, or otherwise accessible by, memory remote from the vehicle 402). In some instances, the vehicle computing device(s) 404 can correspond to or be an example of the vehicle computing device(s) 172 of FIG. 1.

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 can provide data to various components of the vehicle 402 to determine an initial position of the autonomous vehicle 402 for generating a trajectory.

In some instances, the perception component 422 can include functionality to perform object detection, segmentation, and/or classification. In some examples, the perception component 422 can provide processed sensor data that indicates a presence of an object that is proximate to the vehicle 402 and/or a classification of the object as an object type (e.g., car, pedestrian, cyclist, animal, building, tree, road surface, curb, sidewalk, unknown, etc.). In additional and/or alternative examples, the perception component 422 can provide processed sensor data that indicates one or more characteristics associated with a detected object (e.g., a tracked object) and/or the environment in which the object is positioned. In some examples, characteristics associated with the object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc. In some examples, the perception component 422 can use radar data to determine objects, and may receive information about reflected returns, e.g., to include/exclude sensor data, as described herein.

In some examples, the prediction component 424 can include functionality to generate predicted trajectories of objects in an environment. For example, the prediction component 424 can generate one or more predicted trajectories for vehicles, pedestrians, animals, and the like within a threshold distance from the vehicle 402. In some instances, the prediction component 424 can measure a trace of an object and generate a trajectory for the object. In some instances, the prediction component 424 may cooperate with the tracker 434 to track objects as they progress through the environment. In some examples, information from the prediction component 424 may be used when determining whether a radar return is from a known object.

In general, the planning component 426 can determine a path for the vehicle 402 to follow to traverse through an environment. For example, the planning component 426 can determine various routes and trajectories and various levels of detail. For example, the planning component 426 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. Moreover, in some implementations, multiple trajectories can be substantially simultaneously generated (e.g., within technical tolerances) in accordance with a receding horizon technique, with one of the multiple trajectories being selected for the vehicle 402 to navigate. In some instances, the planning component 426 can generate one or more trajectories for the vehicle 402 based at least in part on sensor data, e.g., radar returns. For example, the planning component 426 may exclude returns determined to be reflected returns.

In general, the reflection recognition component 428 can include functionality to identify whether sensor data, e.g., radar returns, correspond to an actual object or a reflection of an object off some intermediate object. In some instances, the reflection recognition component 428 can correspond to the reflection recognition component 174 of FIG. 1. As discussed herein, the reflection recognition component 428 can receive radar data, lidar data, image data, map data, and the like to determine whether sensed objects are actual objects or merely reflections of actual objects. In some instances, the reflection recognition component 428 can provide sensor information determined not to correspond to a reflection to the planning component 426 to determine when to control the vehicle 402 to traverse an environment. In some instances, the reflection recognition component 428 may exclude sensor data determined to correspond to a reflection to the planning component 426, e.g., such that the planning component 426 determines controls at the exclusion of sensor data, e.g., radar data, determined to be associated with a reflection off an intermediate object. The reflection recognition component 428 can also provide sensor information to the tracker 434, e.g., such that the tracker tracks dynamic objects in the environment.

The system controller(s) 430 can be configured to control steering, propulsion, braking, safety, emitters, communication, and other systems of the vehicle 402, e.g., based on controls generated by the planning component 426 and/or based on information from the planning component 426. The system controller(s) 430 can communicate with and/or control corresponding systems of the drive module(s) 414 and/or other components of the vehicle 402.

The map(s) 432 can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In some examples, the map(s) 432 can include at least one map (e.g., images and/or a mesh). The vehicle 402 can be controlled based at least in part on the map(s) 432. That is, the map(s) 432 can be used in connection with the localization component 420, the perception component 422, the prediction component 424, the planning component 426, and/or the reflection recognition component 432 to determine a location of the vehicle 402, identify objects in an environment, and/or generate routes and/or trajectories to navigate within an environment. Moreover, and as described herein, the map(s) 432 can be used to verify the presence of an object, e.g., an intermediate object off of which a radio energy may reflect before being received at a radar sensor.

In some examples, the map(s) 432 can be stored on one or more remote computing devices (such as one or more computing device(s) 438) accessible via one or more networks 436. In some examples, the map(s) 432 can include multiple similar maps stored based on, for example, a characteristic (e.g., type of entity, time of day, day of week, season of the year, etc.). Storing multiple maps 432 in this manner can have similar memory requirements, but increase the speed at which data in a map can be accessed.

The tracker 434 can include functionality to track, e.g., follow, motion of an object. For example, the tracker 434 may receive sensor data from one or more of the sensor system(s) 406 representing dynamic objects in an environment of the vehicle. For instance, an image sensor on the vehicle 402 may capture image sensor data, a LiDAR sensor may capture point cloud data, a radar sensor may obtain returns indicative of a position, pose, or the like of an object in the environment at multiple times. Based on this data, the tracker 434 can determine track information for an object. For instance, track information may provide historical positions, velocities, accelerations, and the like for associated objects. Moreover, in some instances, the tracker 434 may track objects in occluded regions of an environment. U.S. patent application Ser. No. 16/147,177, filed Sep. 28, 2018, for "Radar Spatial Estimation," the entire disclosure of which is hereby incorporated by reference, describes techniques for tracking objects in occluded regions. As described herein, information from the tracker 434 may be used to verify that a radar return corresponds to a tracked object. In at least some examples, the tracker 434 can be associated with the perception component 422, such that the perception component 422 performs data association to determine if newly identified objects should be associated with previously identified objects.

As can be understood, the components discussed herein (e.g., the localization component 420, the perception component 422, the prediction component 424, the planning component 426, the reflection recognition component 428, the system controller(s) 430, the map(s) 432, and the tracker 434) are described as divided for illustrative purposes. However, the operations performed by the various components can be combined or performed in any other component. By way of example, reflection recognition functions may be performed by the perception component 422 and/or the planning system 426 (e.g., rather than the reflection recognition component 428) to reduce the amount of data transferred by the system.

In some instances, aspects of some or all of the components discussed herein can include models, algorithms, and/or machine learning algorithms. For example, in some instances, the components in the memory 418 (and/or memory 442, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 4 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 406 can include LiDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. As another example, the radar system can include multiple instance of the same or different radar sensors disposed at various locations about the vehicle 402. The sensor system(s) 406 can provide input to the vehicle computing device 404. Additionally or alternatively, the sensor system(s) 406 can send sensor data, via the one or more networks 436, to the computing device(s) 438 at a particular frequency, after a lapse of a predetermined period of time, in near real-time, etc. In some instances, the sensor system(s) 406 can correspond to the sensor system(s) 164 of FIG. 1, including the radar sensor(s) 104 and/or the additional sensor(s) 166.

The emitter(s) 408 can be configured to emit light and/or sound. The emitter(s) 408 in this example can include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 410 can enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communication connection(s) 410 can include physical and/or logical interfaces for connecting the vehicle computing device 404 to another computing device or a network, such as the network(s) 436. For example, the communication connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include the drive module(s) 412. In some examples, the vehicle 402 can have a single drive module 412. In at least one example, the vehicle 402 may have multiple drive modules 412 with individual of the drive modules 412 positioned on opposite ends of the vehicle 402 (e.g., the front and the rear, etc.). In at least one example, the drive module(s) 412 can include one or more sensor systems to detect conditions of the drive module(s) 412 and/or the surroundings of the vehicle 402. By way of example and not limitation, the sensor system(s) associated with the drive module(s) 412 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders can be unique to the drive module(s) 412. In some cases, the sensor system(s) on the drive module(s) 412 can overlap or supplement corresponding systems of the vehicle 402 (e.g., the sensor system(s) 406).

The drive module(s) 412 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 412 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 412. Furthermore, the drive module(s) 412 may also include one or more communication connection(s) that enable communication by the respective drive module with one or more other local or remote computing device(s).

In at least one example, the direct connection 414 can provide a physical interface to couple the drive module(s) 412 with the body of the vehicle 402. For example, the direction connection 414 can allow the transfer of energy, fluids, air, data, etc. between the drive module(s) 412 and the vehicle. In some instances, the direct connection 414 can further releasably secure the drive module(s) 412 to the body of the vehicle 402.

In at least one example, the localization component 420, the perception component 422, the prediction component 424, the planning component 426, the reflection recognition component 428, the system controller(s) 430, the map(s) 432, and/or the tracker 434 can process sensor data, as described above, and can send their respective outputs, over the one or more network(s) 436, to one or more computing device(s) 438. In at least one example, the localization component 420, the perception component 422, the prediction component 424, the planning component 426, the reflection recognition component 428, the system controller(s) 430, the map(s) 432, and/or the tracker 434 can send their respective outputs to the one or more computing device(s) 438 at a particular frequency, after a lapse of a predetermined period of time, in near real-time, etc.

In some examples, the vehicle 402 can send sensor data to the computing device(s) 438, e.g., via the network(s) 436. In some examples, the vehicle 402 can send raw sensor data to the computing device(s) 438. In other examples, the vehicle 402 can send processed sensor data and/or representations of sensor data (e.g., spatial grid data) to the computing device(s) 438. In some examples, the vehicle 402 can send sensor data to the computing device(s) 48 at a particular frequency, after a lapse of a predetermined period of time, in near real-time, etc. In some cases, the vehicle 402 can send sensor data (raw or processed) to the computing device(s) 438 as one or more log files.

The computing device(s) 438 can include processor(s) 440 and memory 442 storing one or more maps 444 and/or a reflection recognition component 446.

In some instances, the map(s) 444 can be similar to the map(s) 432. The reflection recognition component 448 may perform substantially the same functions as those described for the reflection recognition component 428 in addition to or instead of performing the functions at the vehicle computing device(s) 404.

The processor(s) 416 of the vehicle 402 and the processor(s) 440 of the computing device(s) 438 can be any suitable processor capable of executing instructions to process data and perform operations as described herein. By way of example and not limitation, the processor(s) 416 and 440 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. The memory 418 and 442 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 438 and/or components of the computing device(s) 438 can be associated with the vehicle 402. That is, the vehicle 402 can perform one or more of the functions associated with the computing device(s) 438, and vice versa. Further, aspects of the reflection recognition components 428, 446, and/or the tracker 434 can be performed on any of the devices discussed herein.

Figure 5:
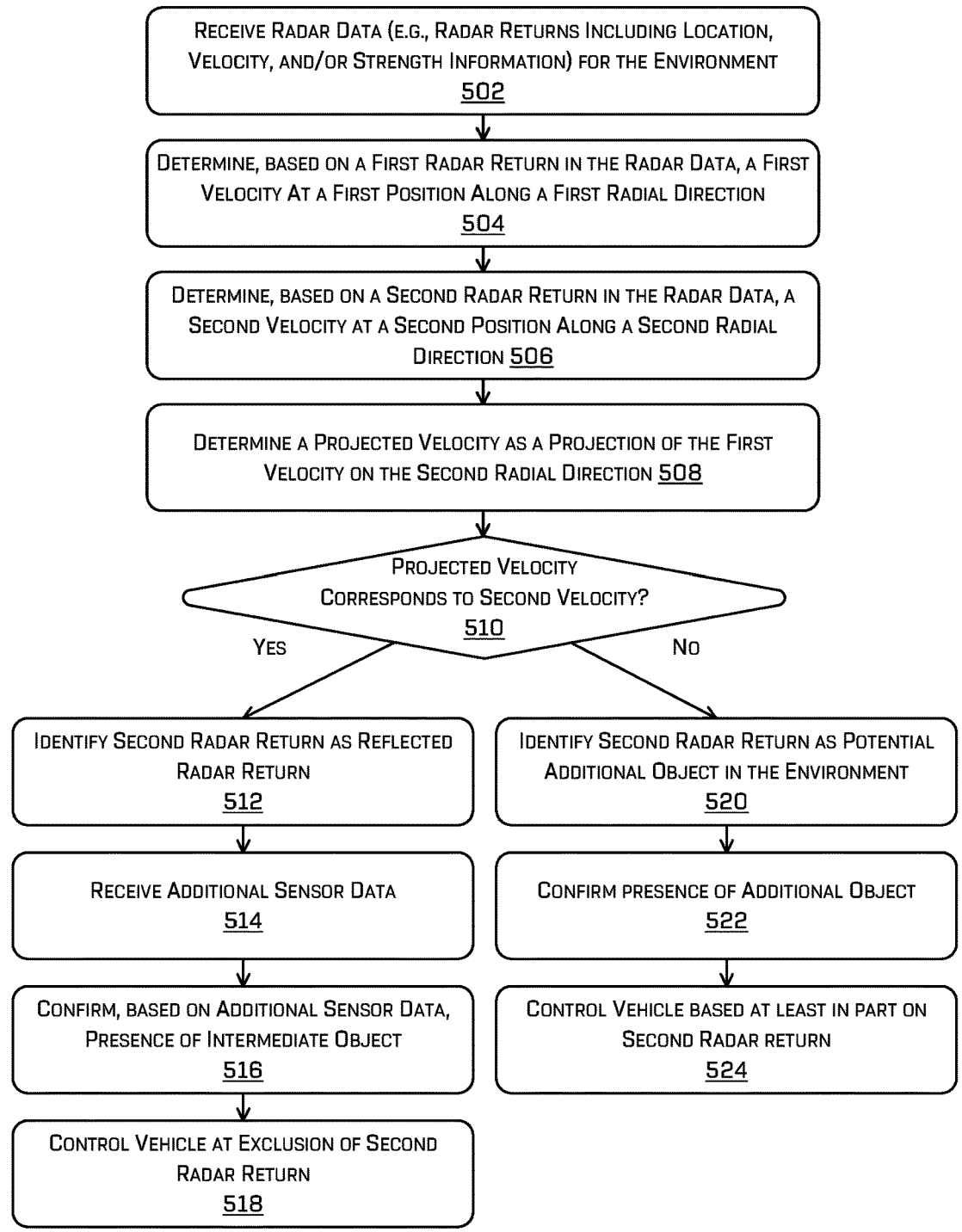
FIG. 5 depicts a flow chart of an example process for implementing radar reflection recognition techniques using velocity information, in accordance with embodiments of the disclosure.

FIG. 5 is a flow diagram of an example process 500 for determining whether radar returns are reflected returns, in accordance with embodiments of the disclosure. Although discussed in the context of radar data, the example process 500 may be used in the context of and/or in combination with LiDAR data, sonar data, time-of-flight image data, and/or other types of data.

At operation 502, the process 500 can include receiving radar data for the environment. For example, the radar data may include radar returns including location, velocity, and/or strength information. In some examples, the radar system may include one or more radar sensors and may be a sensor system of an autonomous vehicle, such as vehicle 102 described above. The radar data may include multiple returns, including static returns corresponding to objects having a location and a zero velocity, and dynamic returns or radar tracks corresponding to moving objects having a location and a non-zero velocity.

At operation 504, the process 500 can include determining, based on a first radar return in the radar data, a first velocity at a first position along a first radial direction. The first radar return may include a velocity having a direction along a first direction between the object and the vehicle, e.g., along a radial direction extending from (the radar sensor on) the vehicle and through the object. In some instances, the first radar return may be an object return, e.g., corresponding to a known object in the environment. In some examples, the first radar return may be determined to correspond to an object return based on tracking information generated prior to receiving the radar data. In other instances, however, the techniques described herein can operate without any a priori knowledge of the return. Stated differently, the first return (and additional returns, including a second return discussed below) may not be associated with an object in the environment, and such an association may be unnecessary in some instances. The position of the first radar return may be a distance along the first radial direction.

At operation 506, the process 500 can include determining, based on a second radar return in the radar data, a second velocity at a second position along a second radial direction. For example, like the first radar return, the second radar return (and other radar returns) may not be associated with a known object in the environment. The second radar return may be a return from another object in the environment, e.g., a newly-detectable object, and/or from a reflection off some intermediate object in the environment. In the latter case, the second radar return may identify a phantom "object" at the location along the second radial direction.

At operation 508, the process 500 can determine a projected velocity as a projection of the first velocity onto the second radial direction. For example, the operation 508 can project one of the returns in a pair of returns, e.g., the first return, onto the direction associated with the other of the returns in the pair, e.g., a unit vector associated with the second return. As will be appreciated, since a reflected return cannot be closer than an object (e.g., a direct) return, the operation 508 may project the velocity associated with the closer of the first and second returns onto the direction associated with the farther-away of the returns. For example, and with reference to the example of FIG. 2, the first return may be the object return 122 and the second return may be the first reflected return 138. The projected velocity determined by the operation 508 may be a radial component of the object return velocity 160 reflected over the line 210 that bisects and is perpendicular to the line 208 connecting the object return 122 and the first reflected return 138. Accordingly, the projected velocity may be a velocity that would result from a reflection of radio energy first off the object and, subsequently, an intermediate object disposed along the second direction.

At operation 510 the process 500 can determine whether the projected velocity corresponds to the second velocity. For instance, at operation 510 a magnitude of the radial component of the projected velocity, e.g., a component along the second radial direction, may be compared to a magnitude of the second velocity (which is measured along the second radial direction by the radar sensor). For instance, the comparison may determine whether the magnitude of the radial component is substantially equal to the magnitude of the second velocity. As used herein, the term substantially equal and similar terms may connote that two values are equal or within some threshold margin of each other. For instance, a margin may be an absolute value (e.g., 0.1 m/s, 0.5 m/s, 2 m/s, or the like), a percentage (e.g., 0.5%, 1%, 10%), or some other measure. In some examples, the margin may be based on a fidelity of the radar sensor, a distance of the object, a distance associated with the returns, a velocity of the object, a velocity associated with the returns, and/or other features and/or factors.

If, at operation 510, it is determined that the projected velocity corresponds to the second velocity, at operation 512 the process 500 can identify the second radar return as (or likely to be) a reflected radar return. For example, because the return closely corresponds to the (theoretical) reflection of the first return, a vehicle computing device may determine that the return is (likely to be) a reflected return.

At operation 514, the process 500 may optionally receive additional sensor data, and, at operation 516, the process 500 may optionally confirm, based on the additional sensor data, presence of an intermediate object. For example, the operations 514, 516 may confirm that the second radar return is a reflected return by confirming the presence of an intermediate object (that would have reflected radio energy) causing the reflection. As described herein, additional sensor data may be any type of sensor data from one or more sensor modalities disposed on or otherwise associated with the vehicle. In some examples, the presence of the intermediate object may also be confirmed from map data (e.g., when the intermediate object is a fixture, topographical feature, or the like). In other implementations, the additional sensor data received at the operation 514 can be subsequently received data, including, but not limited to, subsequent radar data. By way of non-limiting example, the subsequently-received data can be used to track the second return over time. As noted herein, reflected returns may be ephemeral, and attempts to track the second return with previous and/or subsequent additional sensor data may be futile.

At operation 518, the process 500 may control the vehicle at the exclusion of the radar return. For example, because the radar return has been determined to be a reflected return, and not representative of an actual object in the environment, control of the vehicle may not be dependent upon the radar return. As described herein, conventional planning system may have controlled the vehicle to react (e.g., by braking, steering, or the like) to the phantom "object," represented by the radar return. However, by identifying and excluding reflected returns, techniques described herein can provide improved control, e.g., response only to actual objects in the environment.

In contrast, if at operation 512 it is determined that the projected velocity does not correspond to the second velocity, at operation 520 the process 500 can identify the radar return as a potential additional object in the environment. For example, when the magnitude of the second velocity does not correspond to the radial component of the projected velocity, the second radar return likely is not a reflected return. Instead, the second return may correspond to an actual object in the environment. For example, the second return may be from a newly detected object, e.g., the pedestrian emerging from the building in the example of FIG. 2.

At operation 522, the process 500 may optionally confirm a presence of the additional object. For example, the operation 522 may include receiving additional sensor information, and, based at least in part on that additional sensor information, determining the presence of an object at the location associated with the second radar return. The additional sensor information may include one or more of LiDAR data, image data, additional radar data, time-of-flight data, or the like. In some examples, the operation 522 can be substantially the same as the operation 516, but will confirm the presence of an object at the second position, instead of at some intermediate point.

At operation 524, the process 500 can include controlling the vehicle based at least in part on the second radar return. For example, because the second radar return may be associated with an actual, dynamic object, techniques described herein may control the vehicle relative to that object. In some instances, a trajectory of the vehicle can be determined based at least in part on the second radar return. By way of non-limiting example, a prediction system, like the prediction component 324, can determine a predicted trajectory of the additional object, and a planning system, e.g., the planning component 326, can generate a trajectory for the vehicle relative to the predicted trajectory of the additional object. In some implementations, the operation 524 can also or alternatively include tracking the additional object, e.g., such that the subsequent returns from the additional object can be treated object returns. Such object returns may be used to determine reflected returns caused by the additional object.

Figure 6:
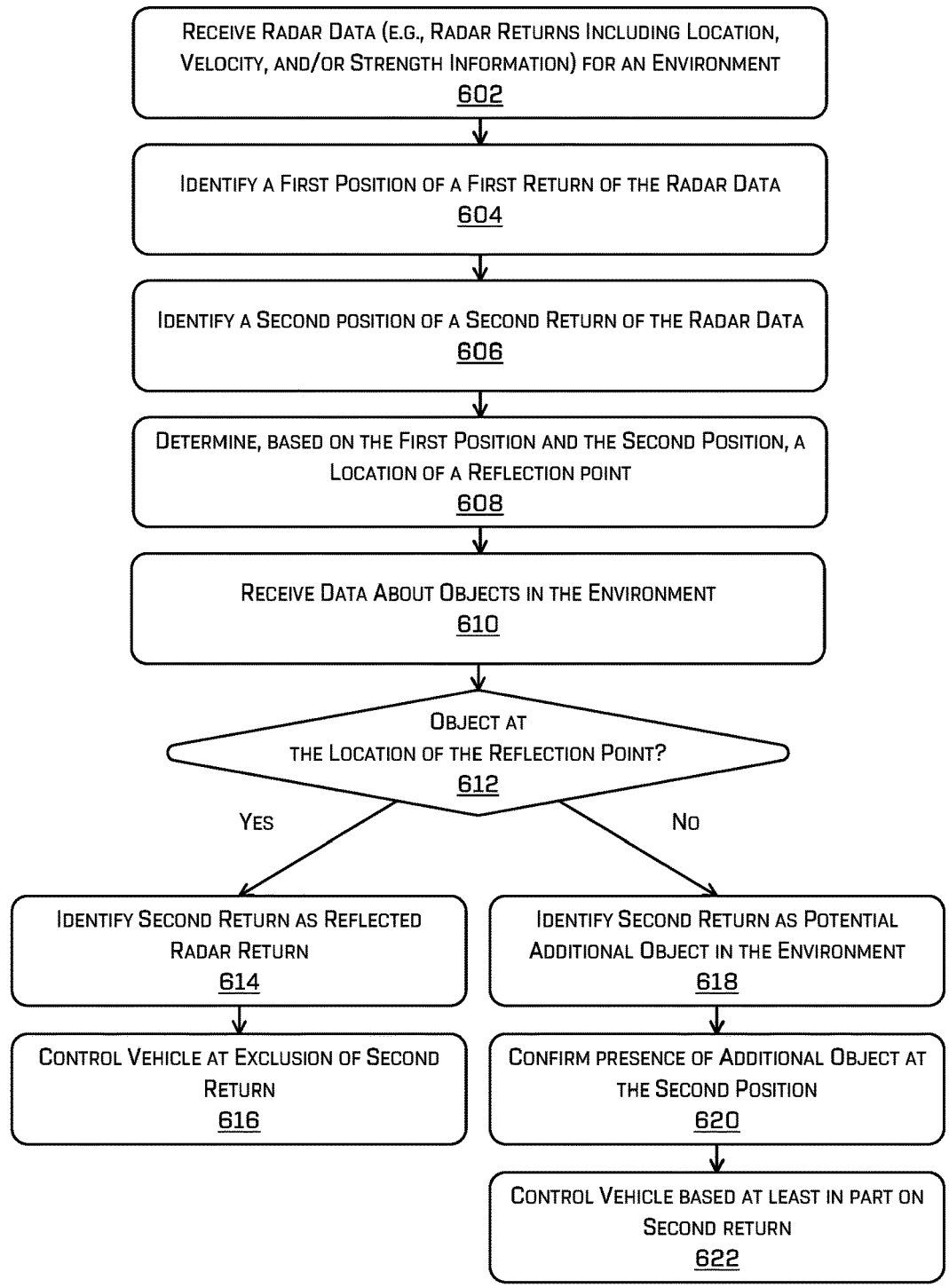
FIG. 6 depicts a flow chart of an example process for implementing radar reflection recognition techniques using position information, in accordance with embodiments of the disclosure.

FIG. 6 is a flow diagram of another example process 600 for determining whether radar returns are reflected returns, in accordance with embodiments of the disclosure. The process 600 may be used instead or, or in addition to, the process 500 discussed above. Aspects of the process 600 may correspond to techniques discussed above with reference to FIG. 3, although the process 600 is not limited to the environment shown in FIG. 3. Moreover, although discussed in the context of radar data, the example process 600 may be used in the context of and/or in combination with LiDAR data, sonar data, time-of-flight image data, and/or other types of data.

At operation 602, the process 600 can include receiving radar data for the environment. For example, the radar data may include radar returns including location, velocity, and/or strength information. In some examples, the radar system may include one or more radar sensors and may be a sensor system of an autonomous vehicle, such as the vehicle 102, 402 described above. The radar data may include multiple returns, including static returns corresponding to objects having a location and a zero velocity, and dynamic returns or radar tracks corresponding to moving objects having a location and a non-zero velocity.

At operation 604, the process 600 can include identifying a first position of a first return of the radar data. The first radar return may identify a depth or range of the return, a position, e.g., an angular position, of the return relative to the sensor, and/or a velocity. In some instances, the first radar return may be an object return, e.g., corresponding to a known object in the environment. In some examples, the first radar return may be determined to correspond to an object return based on tracking information generated prior to receiving the radar data. In other instances, however, the techniques described herein can operate without any a priori knowledge of the return. Stated differently, the first return (and additional returns, including a second return discussed below) may not be associated with an object in the environment, and such an association may be unnecessary in some instances. The position of the first radar return may be a position along a first radial direction, an x-y coordinate in a coordinate system, or some other position information.

At operation 606, the process 600 can include identifying a second position of a second return of the radar data. The second radar return may identify a depth or range of the return, position, e.g. angular position, of the return relative to the sensor, and/or velocity. In other implementations, the position of the second radar return may be an x-y coordinate in a coordinate system, or some other position information. The second radar return may be a return from another object in the environment, e.g., a newly-detectable object, and/or from a reflection off some intermediate object in the environment. In the latter case, the radar return may identify a phantom "object" at the location along the radial direction. Techniques described herein may be used to determine whether the return is a reflected return.

At operation 608, the process 600 can determine, based on the first position and the second position, a location of a reflection point. For example, the techniques described herein can determine the reflection point as a point in space, along the second radial direction, at which radio energy reflected off an object associated with the first return would have reflected for the sensor to generate the second return. In some examples, the operation 610 can determine the reflection point using the geometry associated with the positions of the first and second returns. FIG. 3 shows an example technique in which the reflection point can be determined as an intersection of a first line extending between the sensor and the second return and a second line that is perpendicular to and bisects a line extending between the first and second returns. Additionally, or alternatively, the assumption that line segments from the reflection point to the two points are equal can be used to determine where along the line the reflection point lies. As will be appreciated, for any given pair of points, the reflection point will necessarily be on the line between the sensor and the return that is radially farther-away from the sensor, thus, in the example of FIG. 6, the second return will be farther away than the first return.

At operation 610 the process 600 can receive data about objects in the environment. For instance, the operation 610 may include receiving additional sensor data about the environment. Such additional sensor data may be any type of sensor data from one or more sensor modalities disposed on or otherwise associated with the vehicle. In some examples, the operation 610 can include receiving map data of the environment. In examples described herein, the data about the objects may be from any source that can provide information about objects, whether static or dynamic, about in the environment.

At operation 612, the process 600 determines whether an object is at the location of the reflection point. As described above, the geometry of the returns allows for determining a theoretical reflection point, i.e., a point at which radio energy reflected first off an object associated with the first return would subsequently reflect to give a return at the location of the second return. Such a reflection is a ghost, or phantom, reflection, as opposed to a (direct) reflection off an object in the environment. Thus, while such a theoretical point can be determined for any pair of returns, the data about the objects received at 610 can be used to determine whether there is, in actuality, an object at the theoretical reflection point.

If, at operation 612, it is determined that there is an object at the reflection point, at operation 614 the process 600 can identify the second radar return as a reflected radar return. For example, because the position of the second return closely corresponds to the position of a (theoretical) reflection of the first return at the reflection point, and there is an object at the theoretical reflection point, a vehicle computing device may determine that the return is a reflected return. For example, the vehicle computing device can flag the second return as a potential reflected return and/or send information to other components of the vehicle.

At operation 616, the process 600 may control the vehicle at the exclusion of the second radar return, or otherwise account for it. For example, because the second radar return has been determined to be a reflected return, and not representative of an actual object in the environment, control of the vehicle may not be dependent upon the second radar return. As described herein, conventional planning systems may have controlled the vehicle to react (e.g., by braking, steering, or the like) to the phantom "object," represented by the second radar return. However, by identifying and excluding reflected returns, techniques described herein can provide improved control, e.g., response only to actual objects in the environment. In some implementations, techniques described herein can also track the second return to confirm that it is a reflection point. As noted above, environmental geometry will create conditions that allow for the reflected returns, but that geometry is constantly changing. Thus, while the reflected return may be in one radar scan, it is unlikely to be in subsequent (or preceding) scans, and thus attempting to the track the ephemeral return may not be possible.

In contrast, if at operation 612 it is determined that there is no object at the location of the reflection point, at operation 518 the process 600 can identify the second radar return as a potential additional object in the environment. For example, when there is no object at the reflection point, the radar return likely is not a reflected return. Instead, the second return may correspond to an actual object in the environment. For example, the return may be from a newly detected object, e.g., the pedestrian emerging from the building in the example of FIG. 3.

At operation 620, the process 600 may optionally confirm a presence of the additional object. For example, the operation 624 may include receiving additional sensor information, and, based at least in part on that additional sensor information, determining the presence of an object at the location associated with the second radar return. The additional sensor information may include one or more of LiDAR data, image data, additional radar data, time-of-flight data, or the like. In some implementations, the operation 620 may be substantially the same as the operation 610, 612, but instead of determining the presence of an object at the reflection point, the process 600 may determine the presence of an object at the second location, i.e., of the second return.

At operation 622, the process 600 can include controlling the vehicle based at least in part on the second return. For example, because the second return may be associated with an actual, dynamic object, techniques described herein may control the vehicle relative to that object. In some instances, a trajectory of the vehicle can be determined based at least in part on the second return. By way of non-limiting example, a prediction system, like the prediction component 424, can determine a predicted trajectory of the additional object, and a planning system, e.g., the planning component 426, can generate a trajectory for the vehicle relative to the predicted trajectory of the additional object. In some implementations, the operation 622 can also or alternatively include tracking the additional object, e.g., such that the subsequent returns from the additional object can be treated as object returns. Such object returns may be used to determine reflected returns caused by the additional object.

Operations of the processes 500, 600 may be performed serially and/or in parallel. By way of non-limiting example, the radar data received at the operations 502, 504, 602 may include a plurality of radar returns. In some implementations, the operations 506, 508, 510, 512, 608, 610, 612 and so forth may be performed for each of the radar returns, e.g., in parallel. Thus, all reflected returns from the radar data may be identified relatively quickly, and removed from consideration, as described herein. Moreover, while only a single pair of returns is referenced in FIGS. 5 and 6, multiple pairs of returns may be compared using the techniques described herein. By way of non-limiting example, the same return may be compared to multiple other returns (which may or may not be known to be associated with objects in the environment). In some examples, multiple radar returns for each known object can be received, and those returns can be compared to other returns not associated with an object, e.g., using the process 400 or the process 500. Moreover, pairs of returns may be processed according to both the process 400 and the process 500, e.g., to gain further confidence that a return is a reflection. In still other implementations, the plurality of radar returns may be filtered, e.g., such that only some subset of the plurality of radar returns is processed. For instance, radar returns that are relatively closer to the vehicle 102 than a known object cannot be reflected returns, and thus may be not be investigated in accordance with aspects of the process 500. Moreover, radar returns that have a velocity below a minimum, e.g., non-zero, velocity may also by excluded from investigation, e.g., because those returns, even if reflected returns, may have minimal impact on the vehicle. Moreover, returns that are angled (relative to the radar sensor(s) 104/vehicle 102) equal to greater than a threshold angle, e.g., 45-degrees, 60-degrees, 90-degrees, or the like. Other filtering techniques and criteria also may be used.

FIGS. 5 and 6 illustrate example processes in accordance with embodiments of the disclosure. The processes illustrated in FIGS. 5 and 6 may, but need not necessarily, be performed as a plurality of sub-processes, e.g., by different components of the vehicles 102, 402. The processes 500, 600 are illustrated as logical flow graphs, in which each operation represents a sequence of operations that can be implemented in hardware, software, or a combination thereof. In the context of software, the operations represent computer-executable instructions stored on one or more non-transitory computer-readable storage media that, when executed by one or more processors, causer a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A: An example autonomous vehicle includes: one or more sensors on the autonomous vehicle including at least a radar sensor; one or more processors; and memory storing processor-executable instructions that, when executed by the one or more processors, cause the autonomous vehicle to perform acts comprising: receiving, from the radar sensor, radar data of the environment, the radar data comprising: a first radar return having an associated first position comprising a first range along a first radial direction from the radar sensor; a second radar return having an associated second position comprising a second range along a second radial direction from the radar sensor; determining, based at least in part on the first position and the second position, a reflection point along the second radial direction; receiving, from the one or more sensors, additional sensor data; identifying, based at least in part on the additional sensor data, an object in the environment; determining, based at least in part on the object being disposed at the reflection point, that the second radar return is a reflected return; and controlling the autonomous vehicle within the environment at the exclusion of the second radar return.

B: The autonomous vehicle of example A, wherein the determining the reflection point comprises: determining a reflection line based at least in part on the first position and the second position; and determining the reflection point as an intersection of the reflection line with a line extending along the second direction.

C: The autonomous vehicle of example A or example B, the acts further comprising: receiving, from the radar sensor and prior to receiving the radar data, previous sensor data associated with a second object; and identifying, based at least in part on the previous sensor data, the first return as an object return associated with the second object.

D: The autonomous vehicle of any one of example A through example C, the acts further comprising: selecting the second return from a plurality of returns based at least in part on the second range being greater than the first range.

E: The autonomous vehicle of any one of example A through example D, the acts further comprising: receiving, from the radar sensor and after receiving the radar data, additional radar returns associated with the environment; and verifying that the second radar return is a reflected return based at least in part on the additional radar returns.

F: An example method comprising: receiving, from a radar sensor on a vehicle, radar data of an environment, the radar data including a plurality of radar returns; determining, based at least in a first radar return of the plurality of radar returns, a first position on a first radial direction extending from the radar sensor; determining, based at least in part on a second radar return of the plurality of radar returns, a second position on a second radial direction extending from the radar sensor; determining a reflection point along the second radial direction and between the radar sensor and the second position; and determining, based at least in part on additional data about the environment, that the second radar return is a reflected return.

G: The method of example F, further comprising: controlling the vehicle within the environment at the exclusion of the second radar return.

H: The method of example F or example G, wherein the determining the reflection point comprises: determining a reflection line based at least in part on the first position and the second position.

I: The method of any one of example F through example H, wherein the additional data comprises at least one of sensor data or map data, the sensor data comprising one or more of lidar data, additional radar data, or image data.

J: The method of any one of example F through example I, further comprising: receiving, from the radar sensor, an additional radar return associated with the environment; and verifying that the second radar return is a reflected return based at least on the additional radar return.

K: The method of any one of example F through example J, further comprising: receiving, from the radar sensor and prior to receiving the radar data, previous radar returns associated with a tracked object in the environment; and identifying, based at least in part on the previous radar returns, the first return as an object return associated with the tracked object.

L: The method of any one of example F through example K, wherein the first return and the second return are selected based at least in part on at least one of ranges associated with the first return and the second return, the first position and the second position, or velocities associated with the first return and the second return.

M: The method of any one of example F through example L, wherein the first return is associated with an object in the environment, and the second return is determined based at least in part on at least one of the second radar return having a second range greater than a first range associated with the first radar return or a second velocity of the second radar return being equal to or greater than a threshold velocity.

N: The method of any one of example F through example M, further comprising: receiving, from an additional sensor on the vehicle, additional sensor data; and identifying, based at least in part on the additional sensor data, an object associated with the first return.

O: One or more example non-transitory computer-readable media storing instructions that, when executed, cause one or more processors to perform operations including: receiving, from a radar sensor on a vehicle, radar data of an environment, the radar data including a plurality of radar returns; determining, based at least in a first radar return of the plurality of radar returns, a first position on a first radial direction extending from the radar sensor; determining, based at least in part on a second radar return of the plurality of radar returns, a second position on a second radial direction extending from the radar sensor; determining a reflection point along the second radial direction and between the radar sensor and the second position; determining, based at least in part on additional data about the environment, presence of an object at a position corresponding to the reflection point; and determining, based at least in part on the presence of the object at the position, that the second radar return is a reflected return.

P: The one or more non-transitory computer-readable media of example O, wherein the determining the reflection point comprises: determining a reflection line based at least in part on the first position and the second position.

Q: The one or more non-transitory computer-readable media of example O or example P, wherein the additional data comprises at least one of sensor data or map data, the sensor data comprising one or more of lidar data or image data.

R: The one or more non-transitory computer-readable media of any one of example O through example Q, the operations further comprising: receiving, from the radar sensor additional radar returns associated with the environment; and verifying that the second radar return is a reflected return based at least in part on the additional radar returns.

S: The one or more non-transitory computer-readable media of any one of example O through example R, the operations further comprising: receiving, from the radar sensor and prior to receiving the radar data, previous radar returns associated with a tracked object in the environment; and identifying, based at least in part on the previous radar returns, the first return as an object return associated with the tracked object.

T: The one or more non-transitory computer-readable media of any one of example O through example S, wherein the first return and the second return are selected based at least in part on at least one of ranges associated with the first return and the second return, the first position and the second position, or velocities associated with the first return and the second return.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving, from a radar sensor on a vehicle, radar data of an environment, the radar data including a first radar return and a second radar return;
determining, based at least in part on the first radar return and the second radar return, a hypothetical reflection point at which an intermediate object would be located if the second radar return is a reflected return associated with the first radar return;
receiving sensor data associated with the hypothetical reflection point from another sensor on the vehicle;
determining, from the sensor data, that an object is located at a position in the environment corresponding to the hypothetical reflection point;
determining, based at least in part on determining that that the object is located at the position in the environment corresponding to the hypothetical reflection point, that the hypothetical reflection point is an actual reflection point;
determining, based on the hypothetical reflection point being an actual reflection point, that the second radar return is a reflected return; and
generating, based at least in part on the second radar return being the reflected return, updated radar data excluding the second radar return.

2. The method of claim 1, wherein the determining the hypothetical reflection point comprises:
determining, based at least in part on the first radar return, a first position on a first radial direction extending from the radar sensor;
determining, based at least in part on the second radar return, a second position on a second radial direction extending from the radar sensor; and
determining the hypothetical reflection point as a point along the second radial direction and between the radar sensor and the second position.

3. The method of claim 2, wherein the determining the hypothetical reflection point further comprises:
determining a reflection line based at least in part on the first position and the second position; and
determining the hypothetical reflection point as an intersection of the reflection line with a line extending along the second radial direction.

4. The method of claim 1, wherein:
the first radar return comprises a first velocity and a first range along a first radial direction from the radar sensor; and
the second radar return comprises a second velocity and a second range along a second radial direction from the radar sensor, the method further comprising:
projecting, as a projected velocity, the first velocity onto a point corresponding to the second radar return; and
determining, based at least in part on the second velocity and the projected velocity, that the second radar return corresponds to a reflected radar return reflected off an intermediate surface at the hypothetical reflection point.

5. The method of claim 1, wherein the determining that the object is located at the position in the environment comprises:
receiving at least one of LiDAR data, camera data, or time-of-flight data as the sensor data; and
identifying, from the sensor data, the object at the position in the environment.

6. The method of claim 5, further comprising:
receiving map data; and
determining, based at least in part on the map data, that the object is located at the position in the environment.

7. The method of claim 1, further comprising:
tracking, based at least in part on the sensor data associated with the hypothetical reflection point and prior to capturing the first radar return and the second radar return, the object in the environment,
wherein determining that the second radar return is a reflected return is further based at least in part on the tracking.

8. An autonomous vehicle, comprising:
a radar sensor on the autonomous vehicle;
an additional sensor on the autonomous vehicle;
one or more processors; and
memory storing processor-executable instructions that, when executed by the one or more processors, cause the autonomous vehicle to perform operations comprising:
receiving, from a radar sensor on a vehicle, radar data of an environment, the radar data including a first radar return and a second radar return;
determining, based at least in part on the first radar return and the second radar return, a hypothetical reflection point at which an intermediate object would be located if the second radar return is a reflected return associated with the first radar return;
receiving sensor data associated with the hypothetical reflection point from another sensor on the vehicle;
determining, from the sensor data, that an object is located at a position in the environment corresponding to the hypothetical reflection point;
determining, based at least in part on determining that that the object is located at the position in the environment corresponding to the hypothetical reflection point, that the hypothetical reflection point is an actual reflection point;
determining, based on the hypothetical reflection point being an actual reflection point, that the second radar return is a reflected return; and
generating, based at least in part on the second radar return being the reflected return, updated radar data excluding the second radar return.

9. The autonomous vehicle of claim 8, wherein the determining the hypothetical reflection point comprises:
determining, based at least in part on the first radar return, a first position on a first radial direction extending from the radar sensor;
determining, based at least in part on the second radar return, a second position on a second radial direction extending from the radar sensor; and
determining the hypothetical reflection point as a point along the second radial direction and between the radar sensor and the second position.

10. The autonomous vehicle of claim 9, wherein the determining the hypothetical reflection point further comprises:
determining a reflection line based at least in part on the first position and the second position; and
determining the hypothetical reflection point as an intersection of the reflection line with a line extending along the second radial direction.

11. The autonomous vehicle of claim 8, wherein:
the first radar return comprises a first velocity and a first range along a first radial direction from the radar sensor; and
the second radar return comprises a second velocity and a second range along a second radial direction from the radar sensor, the operations further comprising:
projecting, as a projected velocity, the first velocity onto a point corresponding to the second radar return; and
determining, based at least in part on the second velocity and the projected velocity, that the second radar return corresponds to a reflected radar return reflected off an intermediate surface at the hypothetical reflection point.

12. The autonomous vehicle of claim 8, the operations further comprising:
receiving map data; and
determining, based at least in part on the map data, that the object is located at the position in the environment.

13. The autonomous vehicle of claim 8, the operations further comprising:
receiving, from the radar sensor and prior to receiving the radar data, previous sensor data associated with a second object; and
identifying, based at least in part on the previous sensor data, the first radar return as an object return associated with the second object.

14. The autonomous vehicle of claim 8, the operations further comprising:
selecting the second radar return from a plurality of returns based at least in part on a range associated with the second radar return being greater than a range associated with the first radar return.

15. One or more non-transitory computer-readable media storing instructions that, when executed, cause one or more processors to perform operations comprising:
receiving, from a radar sensor on a vehicle, radar data of an environment, the radar data including a first radar return and a second radar return;
determining, based at least in part on the first radar return and the second radar return, a hypothetical reflection point at which an intermediate object would be located if the second radar return is a reflected return associated with the first radar return;
receiving sensor data associated with the hypothetical reflection point from another sensor on the vehicle;
determining, from the sensor data, that an object is located at a position in the environment corresponding to the hypothetical reflection point;
determining, based at least in part on determining that that the object is located at the position in the environment corresponding to the hypothetical reflection point, that the hypothetical reflection point is an actual reflection point;
determining, based on the hypothetical reflection point being an actual reflection point, that the second radar return is a reflected return; and
generating, based at least in part on the second radar return being the reflected return, updated radar data excluding the second radar return.

16. The one or more non-transitory computer-readable media of claim 15, wherein the determining the hypothetical reflection point comprises:
determining, based at least in part on the first radar return, a first position on a first radial direction extending from the radar sensor;
determining, based at least in part on the second radar return, a second position on a second radial direction extending from the radar sensor; and
determining the hypothetical reflection point as a point along the second radial direction and between the radar sensor and the second position.

17. The one or more non-transitory computer-readable media of claim 16, wherein the determining the hypothetical reflection point further comprises:
determining a reflection line based at least in part on the first position and the second position; and
determining the hypothetical reflection point as an intersection of the reflection line with a line extending along the second radial direction.

18. The one or more non-transitory computer-readable media of claim 16, wherein:
the first radar return comprises a first velocity and a first range along a first radial direction from the radar sensor; and
the second radar return comprises a second velocity and a second range along a second radial direction from the radar sensor, the operations further comprising:
projecting, as a projected velocity, the first velocity onto a point corresponding to the second radar return; and
determining, based at least in part on the second velocity and the projected velocity, that the second radar return corresponds to a reflected radar return reflected off an intermediate surface at the hypothetical reflection point.

19. The one or more non-transitory computer-readable media of claim 18, wherein determining that the second radar return corresponds to a reflected radar return comprises:
comparing a first magnitude of the projected velocity to a second magnitude of the second velocity; and
determining that the first magnitude is substantially equal to the second magnitude.

20. The one or more non-transitory computer-readable media of claim 16, the operations further comprising:
receiving map data; and
determining, based at least in part on the map data, that the object is located at the position in the environment.

* * * * *